US012689899B2

(12) United States Patent
Kunz et al.

(10) Patent No.: US 12,689,899 B2
(45) Date of Patent: Jul. 21, 2026

(54) SECURE DATA COLLECTION VIA A MESSAGING FRAMEWORK

(71) Applicant: Lenovo (Singapore) Pte. Ltd., New Tech Park (SG)

(72) Inventors: Andreas Kunz, Ladenburg (DE); Dimitrios Karampatsis, Ruislip (GB); Sheeba Backia Mary Baskaran, Friedrichsdorf (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 226 days.

(21) Appl. No.: 18/547,295

(22) PCT Filed: Feb. 21, 2022

(86) PCT No.: PCT/IB2022/051524
§ 371 (c)(1),
(2) Date: Aug. 21, 2023

(87) PCT Pub. No.: WO2022/175914
PCT Pub. Date: Aug. 25, 2022

(65) Prior Publication Data
US 2024/0129739 A1 Apr. 18, 2024

Related U.S. Application Data

(60) Provisional application No. 63/151,473, filed on Feb. 19, 2021.

(51) Int. Cl.
*H04W 12/106* (2021.01)

(52) U.S. Cl.
CPC ................................. *H04W 12/106* (2021.01)

(58) Field of Classification Search
CPC .................................................. H04W 12/106
See application file for complete search history.

(56) References Cited

U.S. PATENT DOCUMENTS 10,757,114 B2 * 8/2020 Ruvio ................. H04L 63/0227
11,212,092 B2 * 12/2021 Liu ..................... H04L 41/0816
(Continued)

OTHER PUBLICATIONS

PCT/IB2022/051524, "International Search Report and the Written Opinion of the International Searching Authority, or the Declaration", International Searching Authority, May 19, 2022, pp. 1-16.
(Continued)

*Primary Examiner* — Viral S Lakhia
(74) *Attorney, Agent, or Firm* — Kunzler Needham Hilton

(57) ABSTRACT

Various aspects of the present disclosure relate to secure data collection via a messaging framework. An apparatus includes at least one memory and at least one processor that is configured to receive a subscription request from a data consumer function, the subscription request comprising a data tag associated with a data producer function, generate a security key for the data tag, generate a binding for the data tag between the security key, the data consumer function, and the data producer function, and transmit, for use in data transmissions between the data producer function and the
(Continued)

data consumer function a service request message to the data producer function, the service request message comprising the data tag and the security key, and a data exposure response message to the data consumer function, the data exposure response message comprising the data tag and the security key.

12 Claims, 22 Drawing Sheets

(56)                References Cited

U.S. PATENT DOCUMENTS

| | | | | |
|---|---|---|---|---|
| 11,265,301 | B1 * | 3/2022 | Gupta | H04L 63/067 |
| 11,283,770 | B2 * | 3/2022 | Middelesch | H04L 63/061 |
| 11,337,062 | B2 * | 5/2022 | Zhang | H04W 76/14 |
| 11,363,461 | B2 * | 6/2022 | Song | H04W 28/06 |
| 11,457,360 | B2 * | 9/2022 | Kunz | H04L 63/0892 |
| 11,632,245 | B2 * | 4/2023 | Al | H04W 76/19 |
| | | | | 713/153 |
| 11,671,824 | B2 * | 6/2023 | Lee | H04L 63/062 |
| | | | | 380/27 |
| 12,041,441 | B2 * | 7/2024 | Wifvesson | H04W 12/033 |
| 2016/0330209 | A1 | 11/2016 | Iacob et al. | |
| 2021/0258779 | A1 * | 8/2021 | Chang | H04W 12/041 |
| 2021/0409940 | A1 * | 12/2021 | Wifvesson | H04L 9/0891 |
| 2022/0182835 | A1 * | 6/2022 | Rajput | H04L 9/0891 |
| 2022/0345883 | A1 * | 10/2022 | Wu | H04W 36/0064 |

OTHER PUBLICATIONS

Lenovo et al., "Solution for KI#1.4", 3GPP TSG-SA3 Meeting #102Bis-e S3-211012, Mar. 1-5, 2021, pp. 1-5.

3GPP, "3rd Generation Partnership Project; Technical Specification Group Services and System Aspects; Study on enablers for network automation for the 5G System (5GS); Phase 2 (Release 17)", 3GPP TR 23.700-91 V17.0.0, Dec. 2020, pp. 1-382.

3GPP, "3rd Generation Partnership Project; Technical Specification Group Services and System Aspects; Study on security aspects of enablers for Network Automation (eNA) for the 5G system (5GS) Phase 2; (Release 17)", 3GPP TR 33.866 V0.3.0, Jan. 2021, pp. 1-16.

3GPP, "3rd Generation Partnership Project; Technical Specification Group Services and System Aspects;Network Domain Security (NDS); IP network layer security (Release 16)", 3GPP TS 33.210 V16.4.0, Jul. 2020, pp. 1-27.

3GPP, "3rd Generation Partnership Project; Technical Specification Group Services and System Aspects; Security architecture and procedures for 5G system (Release 17)", 3GPP TS 33.501 V17.0.0, Dec. 2020, pp. 1-253.

* cited by examiner

User Equipment Apparatus
1200

1205

Memory
1210

Input Device
1215

Output Device
1220

Transceiver 1225

Transmitter
1230

Receiver
1235

Network Interface(s)
1240

Application Interface(s)
1245

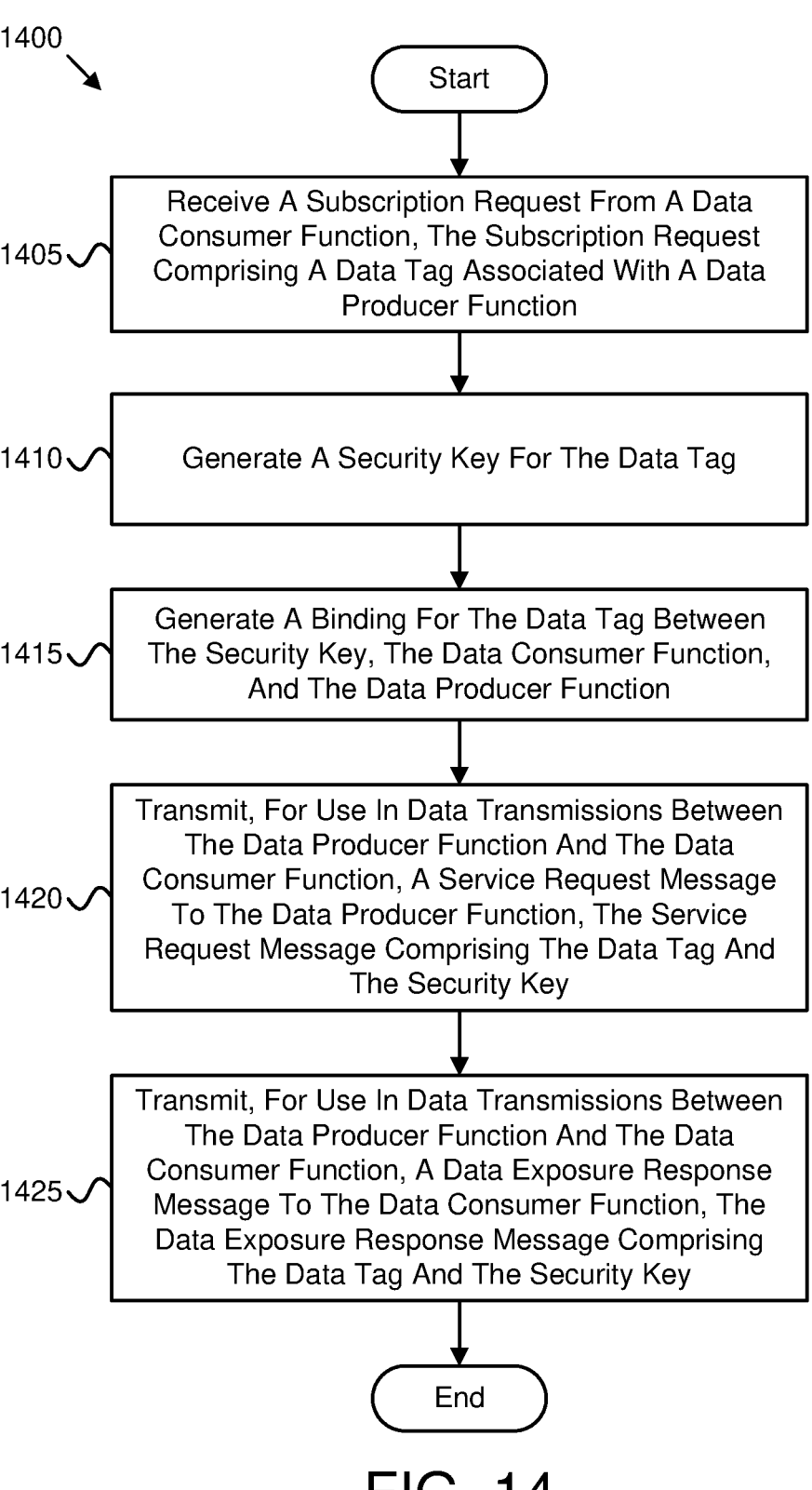

1400

Start

1405 Receive A Subscription Request From A Data Consumer Function, The Subscription Request Comprising A Data Tag Associated With A Data Producer Function 1410 Generate A Security Key For The Data Tag 1415 Generate A Binding For The Data Tag Between The Security Key, The Data Consumer Function, And The Data Producer Function 1420 Transmit, For Use In Data Transmissions Between The Data Producer Function And The Data Consumer Function, A Service Request Message To The Data Producer Function, The Service Request Message Comprising The Data Tag And The Security Key 1425 Transmit, For Use In Data Transmissions Between The Data Producer Function And The Data Consumer Function, A Data Exposure Response Message To The Data Consumer Function, The Data Exposure Response Message Comprising The Data Tag And The Security Key End

FIG. 14

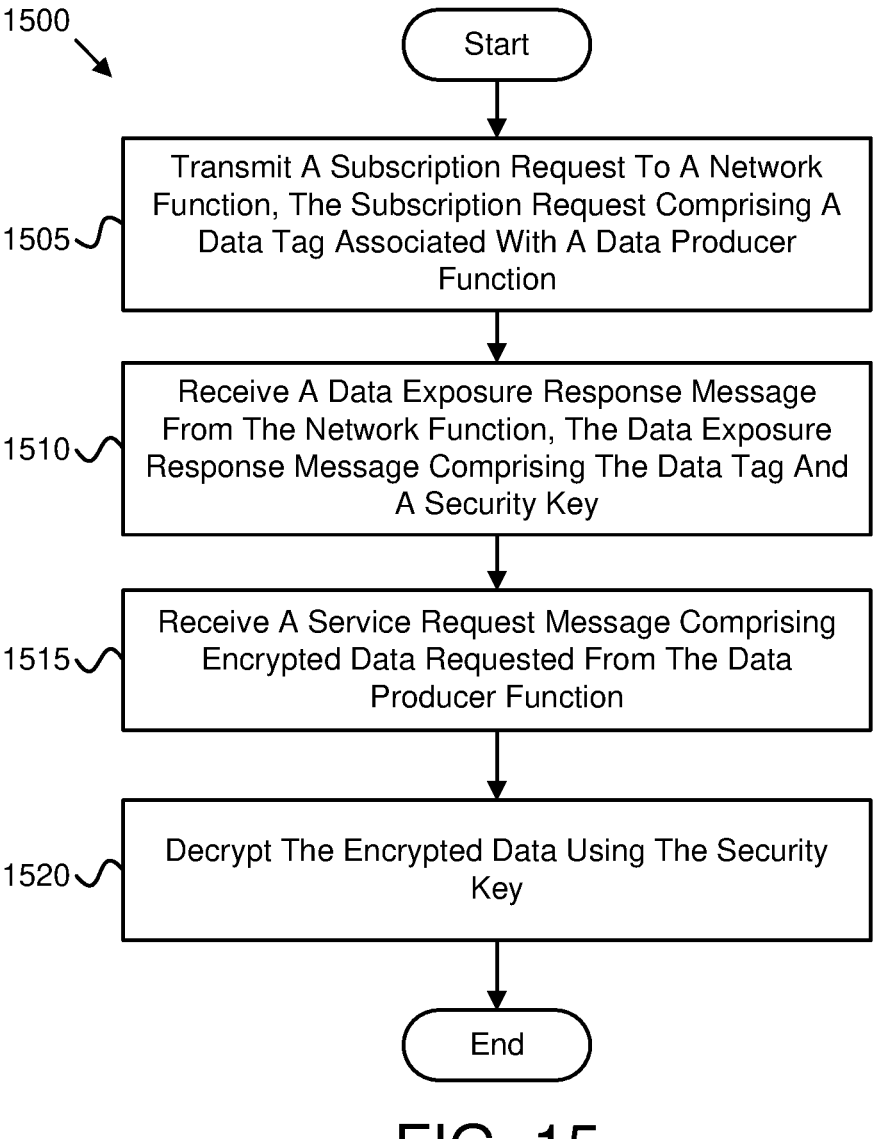

1500

Start

1505 — Transmit A Subscription Request To A Network Function, The Subscription Request Comprising A Data Tag Associated With A Data Producer Function 1510 — Receive A Data Exposure Response Message From The Network Function, The Data Exposure Response Message Comprising The Data Tag And A Security Key 1515 — Receive A Service Request Message Comprising Encrypted Data Requested From The Data Producer Function 1520 — Decrypt The Encrypted Data Using The Security Key End

FIG. 15

SECURE DATA COLLECTION VIA A MESSAGING FRAMEWORK

CROSS-REFERENCE TO RELATED APPLICATIONS

This application claims priority to U.S. Provisional Patent Application No. 63/151,473 entitled "METHOD OF SECURE DATA COLLECTION VIA A MESSAGING FRAMEWORK" and filed on Feb. 19, 2021, for Andreas Kunz, et al., which is incorporated herein by reference.

FIELD

The subject matter disclosed herein relates generally to wireless communications and more particularly relates to secure data collection via a messaging framework.

BACKGROUND

Decoupling of data collection between a data consumer and a data source may induce a security problem because the data consumer cannot verify that the data from the data source is not modified by a messaging framework and the confidentiality of the data cannot be guaranteed by the messaging framework. The introduction of the messaging framework and the decoupling of the data collection between the data consumer and the data source is a new concept and does not have any solution yet.

BRIEF SUMMARY

Disclosed are solutions for secure data collection via a messaging framework.

In one embodiment, a first apparatus includes a transceiver that receives a subscription request from a data consumer function, the subscription request comprising a data tag associated with a data producer function. In one embodiment, the first apparatus includes a processor that generates a security key for the data tag and generates a binding for the data tag between the security key, the data consumer function, and the data producer function. In one embodiment, the transceiver transmits, for use in data transmissions between the data producer function and the data consumer function, a service request message to the data producer function, the service request message comprising the data tag and the security key, and a data exposure response message to the data consumer function, the data exposure response message comprising the data tag and the security key.

In one embodiment, a first method receives a subscription request from a data consumer function, the subscription request comprising a data tag associated with a data producer function. In one embodiment, the first method generates a security key for the data tag and generates a binding for the data tag between the security key, the data consumer function, and the data producer function. In one embodiment, the first method transmits, for use in data transmissions between the data producer function and the data consumer function, a service request message to the data producer function, the service request message comprising the data tag and the security key, and a data exposure response message to the data consumer function, the data exposure response message comprising the data tag and the security key.

In one embodiment, a second apparatus includes a transceiver that transmits a subscription request to a network function, the subscription request comprising a data tag associated with a data producer function. In one embodiment, the transceiver receives a data exposure response message from the network function, the data exposure response message comprising the data tag and a security key. In one embodiment, the transceiver receives a service request message comprising encrypted data requested from the data producer function. In one embodiment, the second apparatus includes a processor that decrypts the encrypted data using the security key.

In one embodiment, a second method transmits a subscription request to a network function, the subscription request comprising a data tag associated with a data producer function. In one embodiment, the second method receives a data exposure response message from the network function, the data exposure response message comprising the data tag and a security key. In one embodiment, the second method receives a service request message comprising encrypted data requested from the data producer function. In one embodiment, the second method decrypts the encrypted data using the security key.

In one embodiment, a third apparatus includes a transceiver that receives a service request message from a network function, the service request message comprising a data tag and a security key. In one embodiment, the third apparatus includes a processor that detects an event associated with the data tag, stores data associated with the event in a transparent container ("TC") and encrypts the TC with the received security key and integrity protects the TC with a message authentication code—integrity for the TC ("MAC-$I_{TC}$"). In one embodiment, the transceiver transmits the TC to a data consumer associated with the data tag.

In one embodiment, a third method receives a service request message from a network function, the service request message comprising a data tag and a security key. In one embodiment, the third method detects an event associated with the data tag, stores data associated with the event in a transparent container ("TC") and encrypts the TC with the received security key and integrity protects the TC with a message authentication code—integrity for the TC ("MAC-$I_{TC}$"). In one embodiment, the third method transmits the TC to a data consumer associated with the data tag.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 14 is a flowchart diagram illustrating one embodiment of a method for secure data collection via a messaging framework;

FIG. 15 is a flowchart diagram illustrating one embodiment of a method for secure data collection via a messaging framework.

DETAILED DESCRIPTION

Figure 1:
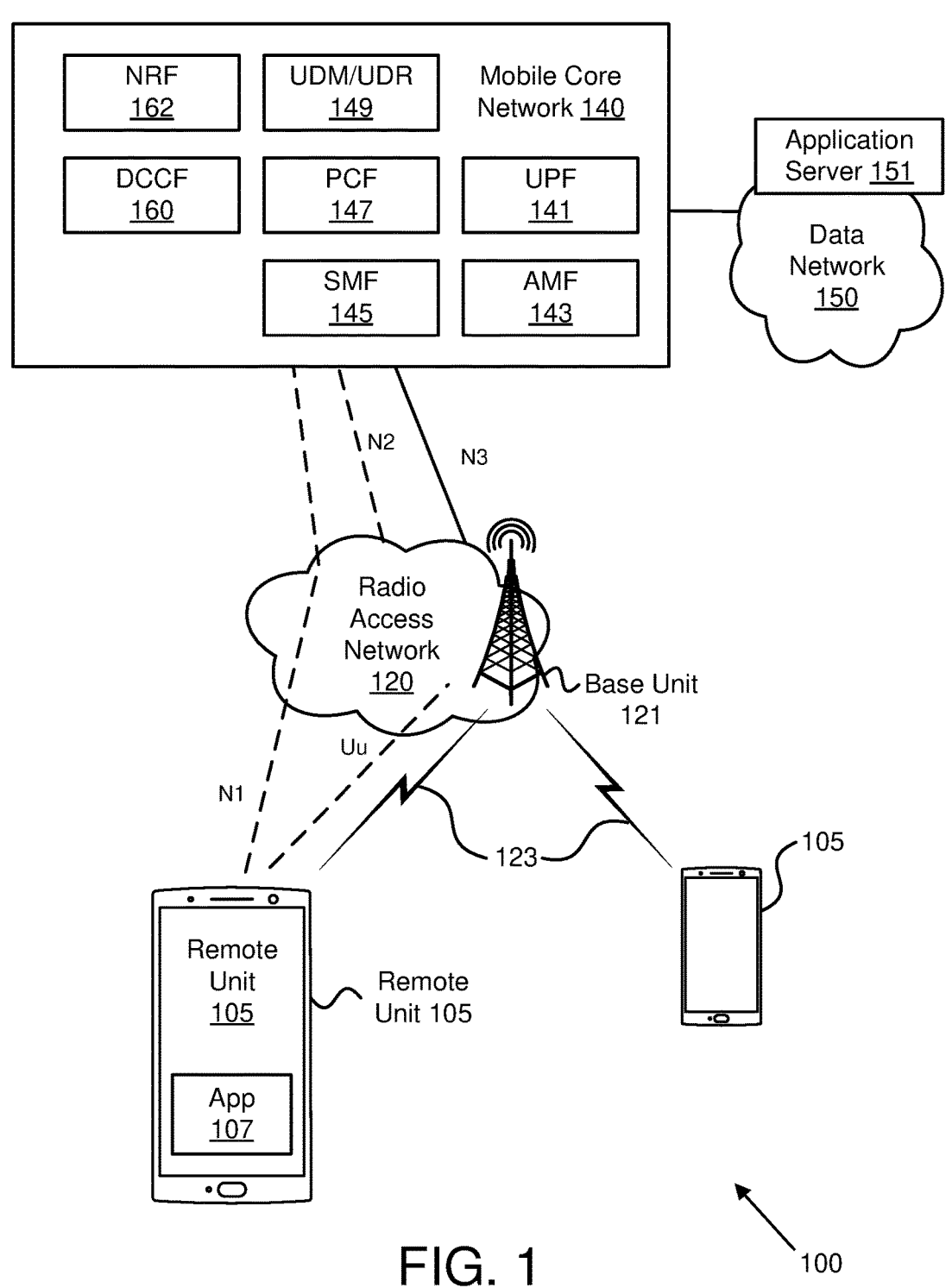
FIG. 1 is a block diagram illustrating one embodiment of a wireless communication system for secure data collection via a messaging framework.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for secure data collection via a messaging framework. This disclosure presents different solutions of key provisioning schemes that allow data producers to encrypt, integrity protect, and replay protect the notification data messages that are sent via the messaging framework. data consumers can decrypt and verify the integrity of the messages. The corresponding key for the data protection is generated and refreshed by the NRF, the DCCF, and/or the data producer itself.

3GPP TR 23.700-91 introduced a separation of the data consumer and producer with the data management network. The DCCF is a control-plane function that coordinates data collection and triggers data delivery to data consumers. The DCCF determines if the requested data of a data consumer is currently being produced by any data source and sent to the messaging framework. The DCCF can then subscribe the data consumer to this data in the messaging framework. The messaging framework is not expected to be standardized by 3GPP and contains the messaging infrastructure that propagates event information and data (e.g., streaming and notifications) from data sources to data consumers.

The Key Issue #1.4 "Security protection of data via messaging framework" of TR 33.866 describes several threats that result from the decoupling of the data collection between the data consumer and the data source. This may induce a security problem because the data consumer cannot verify that the data from the data source is not modified by the messaging framework and the confidentiality of the data cannot be guaranteed by the messaging framework. The following resulting security requirements are defined:

The transfer of the data between data source and data consumer via the messaging framework shall be confidentiality, integrity and replay protected end-to-end between data source and data consumer and Confidentiality protection, integrity protection and replay-protection shall be supported on the new interfaces between 3GPP entities and the adaptors.

The introduction of the messaging framework and the decoupling of the data collection between the data consumer and the data source is a new concept and does not have any solution yet.

The solution herein proposes to use a generated key per requested data tag to confidentiality and integrity protect the data traversing the messaging framework. A counter is used to ensure replay protection. There are three different embodiments possible:

Embodiment #1: Key handing in the NRF;

Embodiment #2: Key handling in the DCCF; and

Embodiment #3: Key handling in the data producer.

Each Embodiment comes in two variations, where in variation #1 only the COUNTER$_{TC}$ for a replay protected generation of the message authentication code—integrity ("MAC-I") of the transparent container ("TC") is initialized at every time a new data consumer joins to subscribe to the event data from the data producer. In variation #2, the key refresh procedure is performed so that a fresh key K$_{TC}$ is also provided to all involved network functions.

FIG. 1 depicts a wireless communication system 100 for secure data collection via a messaging framework, according to embodiments of the disclosure. In one embodiment, the wireless communication system 100 includes at least one remote unit 105, a Radio Access Network 120, and a mobile core network 140. The RAN 120 and the mobile core network form a mobile communication network. The RAN 120 contains at least one base unit 121 and may be composed of a 3GPP access network (e.g., containing at least one cellular base unit), a non-3GPP access network (e.g., containing at least one access point) and/or a wireline access network (e.g., serving a residential gateway). The remote unit communicates with the 3GPP access network 120 using communication links 123. Even though a specific number of remote units 105, RANs 120, base units 121, communication links 123, and mobile core networks 140 are depicted in FIG. 1, one of skill in the art will recognize that any number of remote units 105, RANs 120, base units 121, communication links 123, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the RAN 120 via uplink ("UL") and downlink ("DL") communication signals. Furthermore, the UL and DL communication signals may be carried over the communication links 123. Here, the RAN 120 is an intermediate network that provides the remote units 105 with access to the mobile core network 140.

In some embodiments, the remote units 105 communicate with an application server 151 (or other communication peer) via a network connection with the mobile core network 140. For example, an application 107 in a remote unit 105 (e.g., web browser, media client, telephone/VoIP application) may trigger the remote unit 105 to establish a PDU session (or other data connection) with the mobile core network 140 using the RAN 120 (e.g., a 3GPP access network and/or non-3GPP access network). The mobile core network 140 then relays traffic between the remote unit 105 and the data network 150 (e.g., application server 151) using the PDU session. The PDU session represents a logical connection between the remote unit 105 and the UPF 121. In order to establish the PDU session, the remote unit 105 must be registered with the mobile core network. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data networks and/or other communication peers.

The base units 121 may be distributed over a geographic region. In certain embodiments, a base unit 121 may also be referred to as an access terminal, a base, a base station, a Node-B, an eNB, a gNB, a Home Node-B, a relay node, a device, an access point, or by any other terminology used in the art. The base units 121 are generally part of a radio access network ("RAN"), such as the 3GPP access network 120, that may include one or more controllers communicably coupled to one or more corresponding base units 121. These and other elements of radio access network are not illustrated but are well known generally by those having ordinary skill in the art. The base units 121 connect to the mobile core network 140 via the 3GPP access network 120.

The base units 121 may serve a number of remote units 105 within a serving area, for example, a cell or a cell sector, via a communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the communication links 123. The communication links 123 may be any suitable carrier in licensed or unlicensed radio spectrum. The communication links 123 facilitate communication between one or more of the remote units 105 and/or one or more of the base units 121.

In one embodiment, the mobile core network 140 is a 5G core ("5GC") or the evolved packet core ("EPC"), which may be coupled to a data network (e.g., the data network 150, such as the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes one or more user plane functions ("UPFs"). Here, the mobile core network 140 includes at least a UPF 141 that serves the RAN 120. Note that in certain embodiments, the mobile core network may contain one or more intermediate UPFs (not shown). In such embodiments, the UPF 141 may be an anchor UPF receiving UP traffic of both intermediate UPFs.

The mobile core network 140 also includes multiple control plane functions including, but not limited to, an Access and Mobility Management Function ("AMF") 143, a Session Management Function ("SMF") 145, a Policy Control Function ("PCF") 147, and a Unified data Management/User data Repository function ("UDM/UDR") 149. In certain embodiments, the mobile core network 140 may also include an Authentication Server Function ("AUSF"), a Network Repository Function ("NRF") (used by the various NFs to discover and communicate with each other over APIs), or other NFs defined for the 5GC.

In one embodiment, the mobile core network 140 includes a DCCF 160. As used herein, the DCCF 160 is configured to coordinate collection of data from one or more NF(s) based on data collection requests from one or more Consumer NF(s). The DCCF can be a standalone NF, possibly co-located with a network data analytics function ("NWDAF"), or can be hosted by a NWDAF. data Collection notification to one or more Consumer NF(s) may be supported via a messaging framework. Adaptors supporting 3GPP services allow NFs to interact with the messaging framework.

In one embodiment, the mobile core network 140 includes an NRF 162. As used herein, the NRF 162 is configured to provide a single record of all NFs available in a given PLMN, together with the profile of each and the services they support. In addition to maintaining profiles, it also supports service discovery functions, enabling other NFs to obtain information regarding available NFs that can support specific services.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. Each network slice includes a set of CP and/or UP network functions. A network instance may be identified by a S-NSSAI, while a set of network slices for which remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

While FIG. 1 depicts components of a 5G RAN and a 5G core network, the described embodiments for method of secure data collection via a messaging framework apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station but it is replaceable by any other radio access node, e.g., gNB, BS, eNB, gNB, AP, etc. Further the operations are described mainly in the context of 5G NR. However, the proposed solutions/methods are also equally applicable to other mobile communication systems supporting method of secure data collection via a messaging framework.

The wireless communication system 100 may apply the followings signaling for configuring and/or indicated enhanced PUSCH repetition type A. In some embodiments, a remote unit 105 will implicitly determine whether enhanced repetition type is applied or not based on the number of repetitions indicated to the remote unit 105.

In Rel-15 NR, a PUCCH resource for HARQ-ACK feedback of a particular priority index in response to a PDCCH (including a PDSCH reception with a corresponding PDCCH) is determined based on a last DCI format indicating the particular priority index. In the proposed method, a PUCCH resource for HARQ-ACK feedback of mixed priorities is determined based on a last DCI format of a higher priority index or a last DCI format of a lower priority index indicating a higher priority PUCCH resource, to protect HP HARQ-ACK. Further, repetition of the higher priority PUCCH resource can provide necessary reliability of HP HARQ-ACK transmission.

Figure 2:
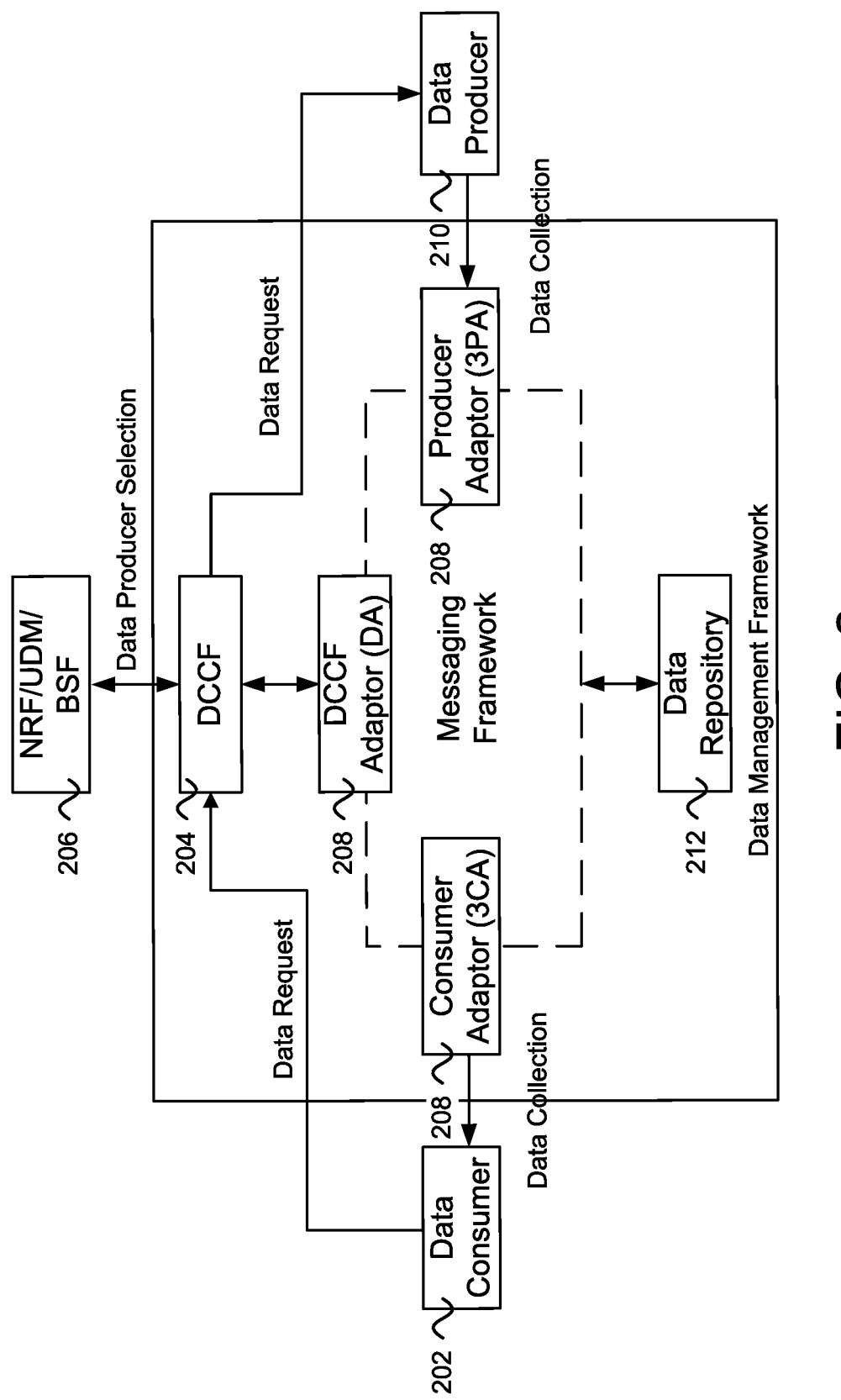
FIG. 2 is a block diagram illustrating one embodiment of a data collection architecture.

FIG. 2 depicts the data collection architecture with the messaging framework and the related network functions.

In one embodiment, a data consumer 202 requests the DCCF 204 for specific data. The DCCF 204 may query the NRF/UDM/BSF 206 for the data producer NF, if not already known because a data exposure to other data consumers is ongoing. The DCCF 204 requests the data reporting from the data producers 210, which then expose the data to the messaging framework at the time of the requested event. The data may be collected in the data Repository Function ("DRF") 212 on request of the DCCF 204, e.g., the DRF acts as a data consumer. The data consumers retrieve the data from the messaging framework via the adaptors.

In the following, the definition of a data tag is used whereas the data tag includes information to identify the data required (e.g., a set of Event ID(s) from data producer NF), information to identify the UE (single UE, group of UE(s) or any UE), optionally information to identify the data producer, and filtering information such as location area or time of day where data is required from.

Further the algorithm for encryption and decryption may be preconfigured in the NFs, so that data consumer and data producer always use the same algorithm. In case multiple algorithms are supported, the NF generating the security key $K_{TC}$ may also select the security algorithm at the time of key generation, e.g., the NRF, DCCF or the data producer. The security algorithm may be sent together with the key $K_{TC}$ to the data consumer and data provider. Another option would be to use the algorithm in the provisioned client/server-side certificates in the NFs.

The NFs (e.g., NRF, DCCF, data consumer, data producer), in one embodiment, may follow the JWE profile defined in TS 33.210 with the restriction that it shall only use AES GCM with a 128-bit or 256-bit key. $K_{TC}$ shall then be used as the Content Encryption Key ("CEK") value to the algorithm indicated in the encryption algorithm ("enc") parameter in the JOSE header. The algorithm ("alg") parameter in the JOSE header denoting the key exchange method shall be set to "dir", e.g., "Direct use of a shared symmetric key as the CEK".

The generation of the security key $K_{TC}$ may be performed in different ways, e.g., either derived from an existing key already available in the NF, e.g., from the key for the transport layer security, from a provisioned key, from a key in the client/server-side certificate, or simply generated with a random number generator that should ensure that the same key is not generated within a certain generation times.

In a first embodiment, key handling in the NRF, the key handling in the NRF is performed in two variations. In general, in variation #1, shown in FIGS. 3A-3B, only the COUNTER$_{TC}$ for generating the MAC-I of the transparent container ("TC") is initialized every time a new data consumer joins to subscribe to the event data from the data producer. In variation #2, shown in FIGS. 4A-4B, the key refresh procedure is performed so that a fresh key K$_{TC}$ is also provided to all involved network functions.

Figure 3A:
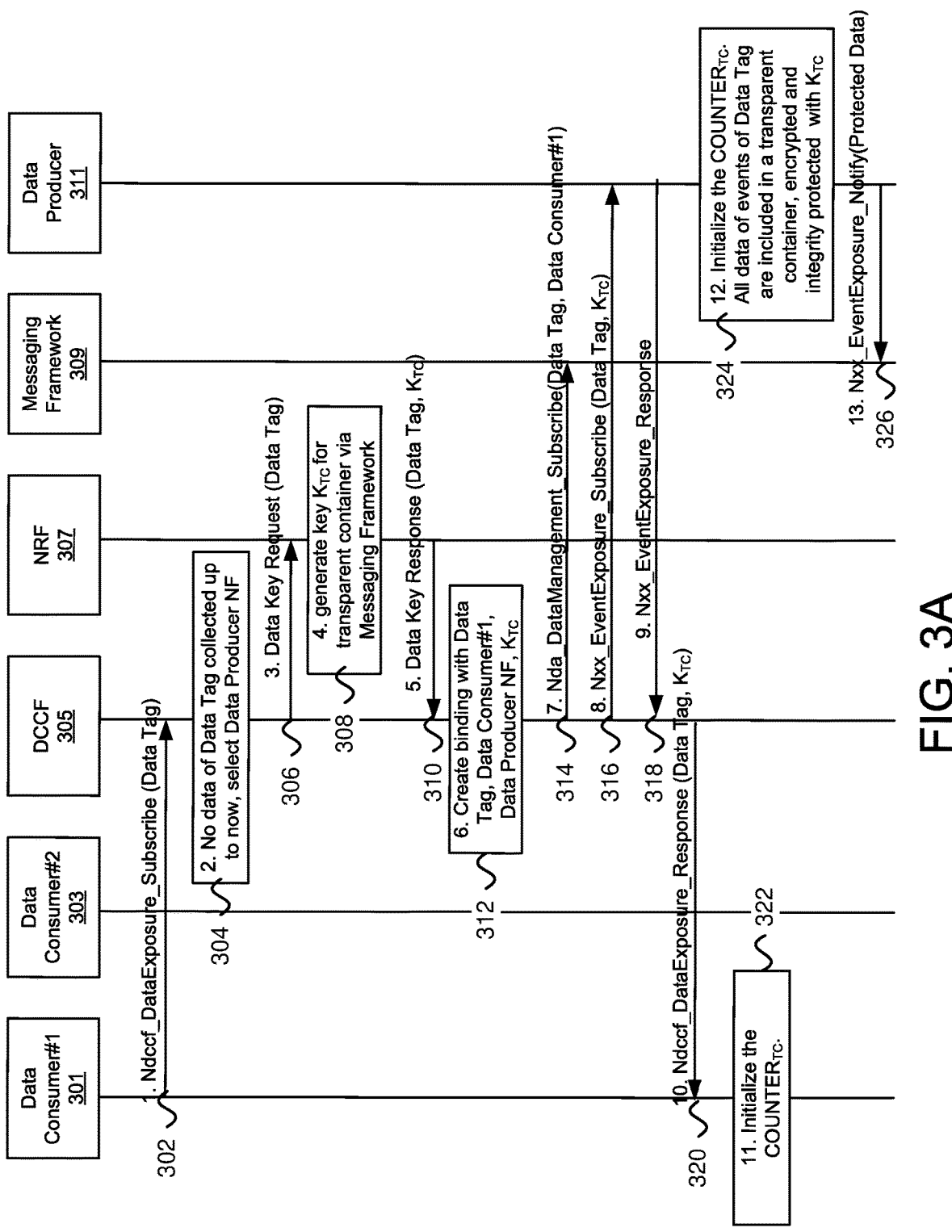
FIG. 3A is a first variation of an embodiment of key handling in a network function repository function ("NRF")
Figure 3B:
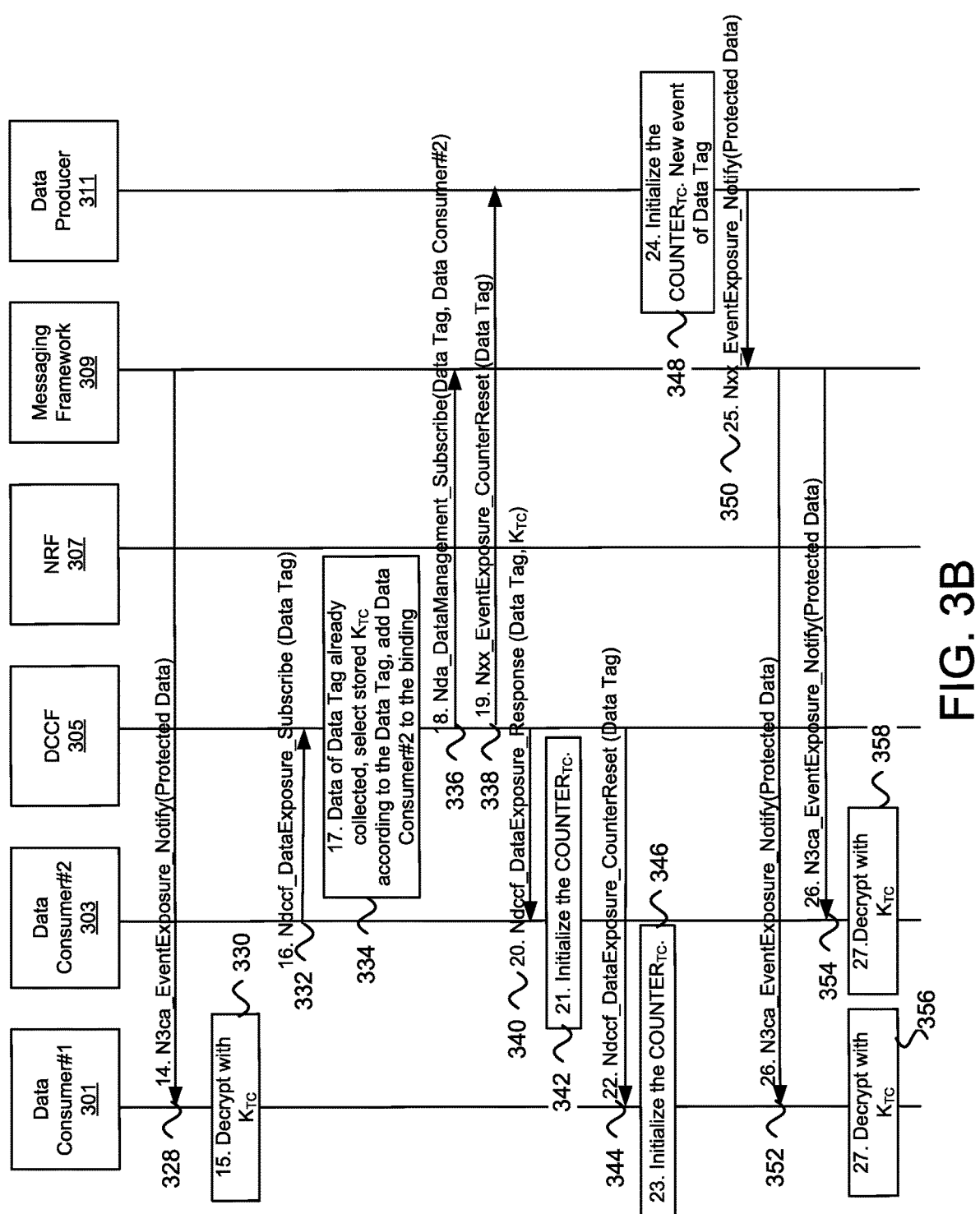
FIG. 3B is a continuation of FIG. 3A.

In variation #1, shown in FIGS. 3A-3B, in one embodiment, at step 1 (see messaging 302), the data consumer #1 301 subscribes for data notifications for a specific data tag. The data tag includes information to identify the data required (e.g., a set of Event ID(s) from data producer NF), information to identify the UE (single UE, group of UE(s) or any UE, optionally information to identify the data producer, and filtering information such as location area or time of day where data is required from.

In one embodiment, at step 2 (see block 304), the DCCF 305 checks whether there is already a notification service running for the requested data tag. If not, the DCCF 305 requests from the NRF/UDM/BSF the data producer, corresponding to the data tag.

In one embodiment, at step 3 (see messaging 306), the DCCF 305 sends a data key request message including the data tag to the NRF 307.

In one embodiment, at step 4 (see block 308), the NRF 307 verifies the request and generates a fresh key K$_{TC}$ for the data tag. K$_{TC}$ is used later by the data producer 311 to protect the TC that contains the requested event data and is sent via the messaging framework. The NRF 307 may select the security algorithm, if not preconfigured in the NFs, which is sent then further together with the key K$_{TC}$ to the data consumer and data producer.

In one embodiment, at step 5 (see messaging 310), the NRF 307 provides the key K$_{TC}$ with the corresponding data tag to the DCCF 305 in a data key response message.

In one embodiment, at step 6 (see block 312), the DCCF 305 creates a binding based on the data tag with the key K$_{TC}$, the data consumer #1 301 and the data producer 311. This is important so that the DCCF 305 knows which network functions are involved for a specific data tag in case the COUNTER$_{TC}$ or the K$_{TC}$ or both need to be updated. The DCCF 305 may select the security algorithm, if not preconfigured in the NFs or already selected by the NRF 307. The security algorithm is sent then further together with the key K$_{TC}$ to the data consumer #1 301 and data producer 311.

In one embodiment, at step 7 (see messaging 314), the DCCF 305 registers the data consumer #1 301 at the messaging framework 309 for notifications corresponding to the data tag.

In one embodiment, at step 8 (see messaging 316), the DCCF 305 sends a service request message to retrieve data from the data producer 311 including the data tag and the key K$_{TC}$.

In one embodiment, at step 9 (see messaging 318), the data producer 311 may initialize the COUNTER$_{TC}$ at this point in time and sends a service response message back to the DCCF 305.

In one embodiment, at step 10 (see messaging 320), the DCCF 305 sends a data exposure response to the data consumer #1 301 including the data tag and the key K$_{TC}$.

In one embodiment, at step 11 (see block 322), upon reception of the key K$_{TC}$, the data consumer #1 301 initializes a corresponding COUNTER$_{TC}$.

In one embodiment, at step 12 (see block 324), an event with respect to the data tag occurs and the data producer 311 includes the event data in a TC for transmission via the messaging framework 309. The data producer 311 encrypts the TC with the K$_{TC}$, and integrity protects the TC with a MAC-I$_{TC}$ e.g., the SoR-MAC-I$_{AUSF}$ as defined in Annex A.17 of TS 33.501. The MAC-I$_{TC}$ is based on the payload, e.g., the TC of the NF service request (e.g., EventExposure_Notify service operation) message, which form the input TC data, a counter of the NF service request (e.g., EventExposure_Notify service operation) messages COUNTER$_{TC}$, and the key K$_{TC}$ to the key derivation function ("KDF"). Alternatively, instead of the TC, the full NF service request message may be used as data input to compute the MAC-I$_{TC}$, accordingly the data consumer 301, 303 would have to do the same. The MAC-I$_{TC}$ is identified with the 128 least significant bits of the output of the KDF. The data producer 311 monotonically increments COUNTER$_{TC}$ for each additional calculated MAC-I$_{TC}$.

In one embodiment, at step 13 (see messaging 326), the data producer 311 sends the requested data in an NF service request (e.g., EventExposure_Notify service operation) with the protected TC to the messaging framework. The message may include the data tag corresponding to the event.

In one embodiment (at FIG. 3B), at step 14 (see messaging 328), the messaging framework 309 identifies the data consumer subscribed to the data tag and sends a requested data in an NF service request (e.g., EventExposure_Notify service operation) including the protected TC to the data consumer #1 301.

In one embodiment, at step 15 (see block 330), the data consumer 301, 303 verifies the MAC-I$_{TC}$ of the NF service request (e.g., EventExposure_Notify service operation), e.g., it selects the key K$_{TC}$ based on the data tag and computes with the key K$_{TC}$ the MAC-I over the NF service request (e.g., EventExposure_Notify service operation) payload, e.g., the TC, in the similar way as the data producer 311 and compares the result with the MAC-I$_{TC}$ included in message. If both are identical, then the message was not modified by the messaging framework 309. The data consumer #1 301 decrypts the TC with the key K$_{TC}$ and monotonically increments COUNTER$_{TC}$.

In one embodiment, at step 16 (see messaging 332), the data consumer #2 303 sends a subscribe message to the same data tag as previously data consumer #1 301.

In one embodiment, at step 17 (see block 334), the DCCF 305 checks whether there is already a notification service running for the requested data tag and identifies the binding of data consumer #1 301 and the data producer 311 and adds the data consumer #1 301 to the binding.

In one embodiment, at step 18 (see messaging 336), the DCCF 305 registers the data consumer #2 303 at the messaging framework 309 for notifications corresponding to the data tag.

In one embodiment, at step 19 (see messaging 338), the DCCF 305 sends a CounterReset message to the data producer 311, the data producer 311 may directly initialize the COUNTER$_{TC}$ for the data tag.

In one embodiment, at step 20 (see messaging 340), the DCCF 305 sends a data exposure response to the data consumer #2 303 including the data tag and the key K$_{TC}$.

In one embodiment, at step 21 (see block 342), upon reception of the key K$_{TC}$, the data consumer #2 303 initializes a corresponding COUNTER$_{TC}$.

In one embodiment, at step 22 (see messaging 344), the DCCF 305 sends a CounterReset message to the data consumer #1 301.

In one embodiment, at step 23 (see block 346), upon reception of the key $K_{TC}$, the data consumer #1 301 initializes a corresponding COUNTER$_{TC}$. The data consumer #1 301 may store the old COUNTER$_{TC}$ in case it subscribed not to real time notifications and retrieves the event notifications always from the messaging framework in certain intervals. In this case, the data consumer #1 301 may store the old COUNTER$_{TC}$ for the duration of this interval or until the next event notification from the messaging framework 309 in case the MAC-I$_{TC}$ was still computed with the old COUNTER$_{TC}$ value.

In one embodiment, at step 24 (see block 24), an event with respect to the data tag occurred and the data producer 311 includes the event data in a TC for transmission via the messaging framework 309. The data producer 311 encrypts the TC with the $K_{TC}$, and integrity protects the TC with a MAC-I$_{TC}$ e.g., the SoR-MAC-I$_{AUSF}$ as defined in Annex A.17 of TS 33.501. The MAC-I$_{TC}$ is based on the payload, e.g., the TC of the NF service request (e.g., EventExposure_Notify service operation) message, which form the input TC data, a counter of the NF service request (e.g., EventExposure_Notify service operation) messages COUNTER$_{TC}$, and the key $K_{TC}$ to the KDF. Alternatively, instead of the TC, the full NF service request message may be used as data input to compute the MAC-I$_{TC}$, accordingly the data consumer 301, 303 would have to do the same. The MAC-I$_{TC}$ is identified with the 128 least significant bits of the output of the KDF. The data producer 311 monotonically increments COUNTER$_{TC}$ for each additional calculated MAC-I$_{TC}$.

In one embodiment, at step 25 (see messaging 350), the data producer 311 sends the requested data in an NF service request (e.g., EventExposure_Notify service operation) with the protected TC to the messaging framework 309. The message may include the data tag corresponding to the event.

In one embodiment, at step 26 (see messaging 352, 354), the messaging framework 309 identifies the data consumers #1 301 and #2 303 subscribed to the data tag and sends a requested data in an NF service request (e.g., EventExposure_Notify service operation) including the protected TC to the data consumers #1 301 and #2 303.

In one embodiment, at step 27 (see blocks 356, 358), the data consumers 301, 303 verify the MAC-I$_{TC}$ of the NF service request (e.g., EventExposure_Notify service operation), e.g., they select the key $K_{TC}$ based on the data tag and compute with the key $K_{TC}$ the MAC-I over the NF service request payload (e.g., EventExposure_Notify service operation), e.g., the TC, in the similar way as the data producer 311 and compare the result with the MAC-I$_{TC}$ included in message. If both are identical, then the message was not modified by the messaging framework 309. The data consumers 301, 303 decrypt the TC with the key $K_{TC}$ and monotonically increment COUNTER$_{TC}$.

In one embodiment, as a variation of the above embodiment, the NRF 307 may generate asymmetric keys for the data producer 311 and the data consumer 301, 303, e.g., a public key provisioned to the data producer for encryption and integrity protection and a private key for the data consumers for decryption.

Figure 4A:
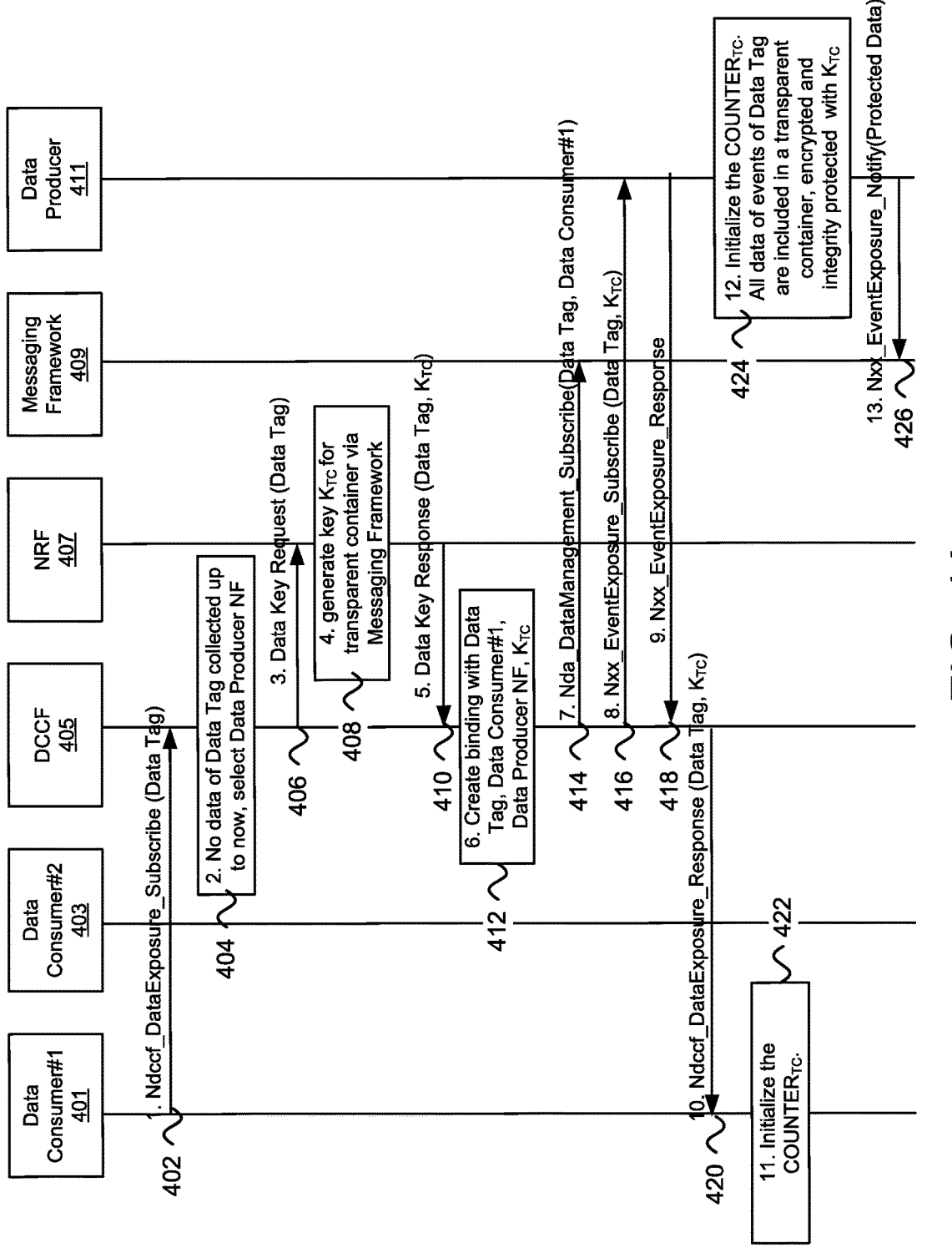
FIG. 4A is a second variation of an embodiment of key handling in NRF.
Figure 4B:
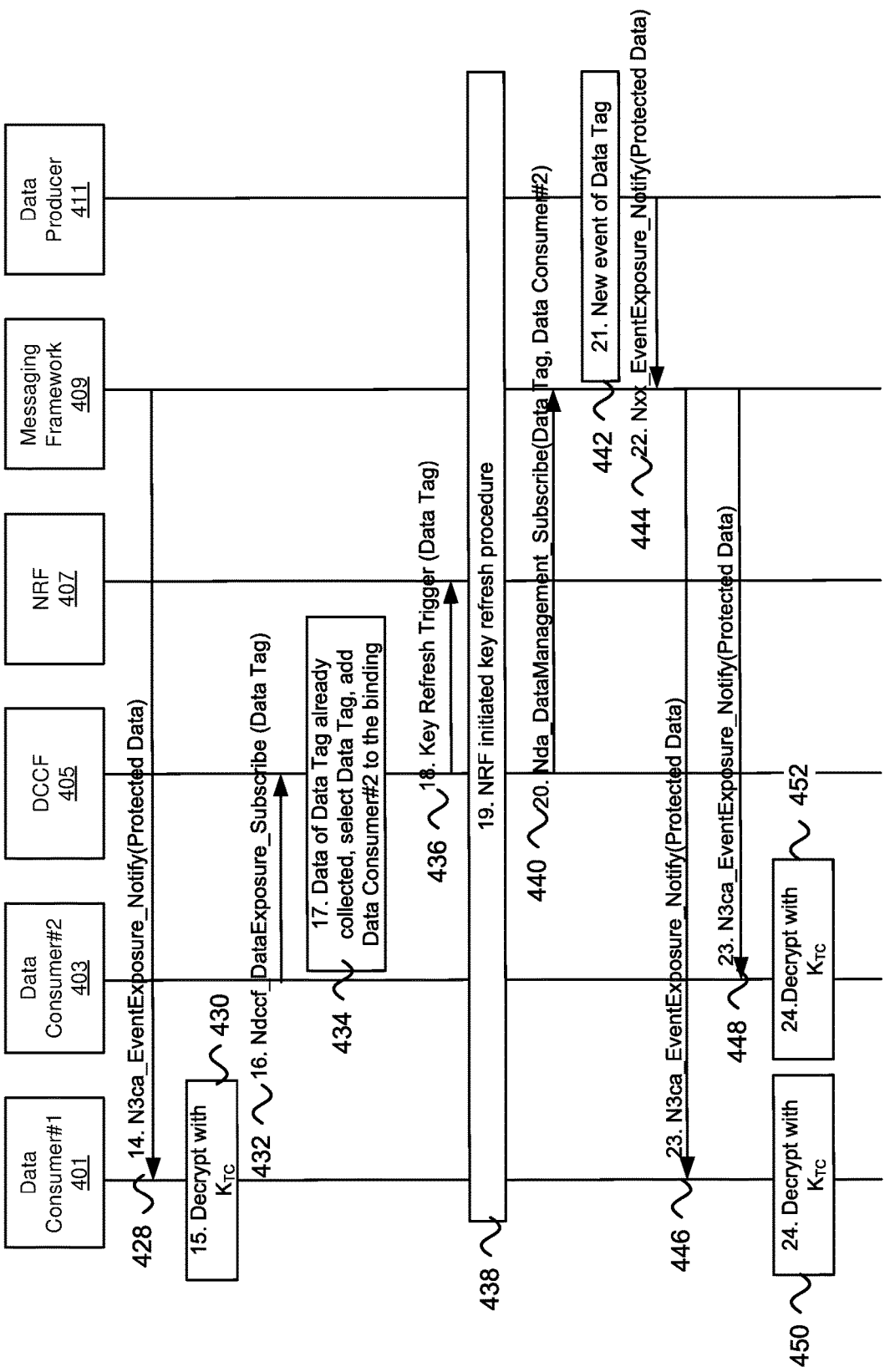
FIG. 4B is a continuation of FIG. 4A.

In a second various of the first embodiment, shown in FIGS. 4A-4B, the variation describes the key exchange with the key refresh procedure when a new data consumer joins the same data tag notifications via the messaging framework 409.

In variation #1, shown in FIGS. 4A-4B, in one embodiment, at step 1 (see messaging 402), the data consumer #1 401 subscribes for data notifications for a specific data tag. The data tag includes information to identify the data required (e.g., a set of Event ID(s) from data producer NF), information to identify the UE (single UE, group of UE(s) or any UE, optionally information to identify the data producer, and filtering information such as location area or time of day where data is required from.

In one embodiment, at step 2 (see block 404), the DCCF 405 checks whether there is already a notification service running for the requested data tag. If not, the DCCF 405 requests from the NRF/UDM/BSF the data producer, corresponding to the data tag.

In one embodiment, at step 3 (see messaging 406), the DCCF 405 sends a data key request message including the data tag to the NRF 407.

In one embodiment, at step 4 (see block 408), the NRF 407 verifies the request and generates a fresh key $K_{TC}$ for the data tag. $K_{TC}$ is used later by the data producer 411 to protect the TC that contains the requested event data and is sent via the messaging framework. The NRF 407 may select the security algorithm, if not preconfigured in the NFs, which is sent then further together with the key $K_{TC}$ to the data consumer and data producer.

In one embodiment, at step 5 (see messaging 410), the NRF 407 provides the key $K_{TC}$ with the corresponding data tag to the DCCF 405 in a data key response message.

In one embodiment, at step 6 (see block 412), the DCCF 405 creates a binding based on the data tag with the key $K_{TC}$, the data consumer #1 401 and the data producer 411. This is important so that the DCCF 405 knows which network functions are involved for a specific data tag in case the COUNTER$_{TC}$ or the $K_{TC}$ or both need to be updated. The DCCF 405 may select the security algorithm, if not preconfigured in the NFs or already selected by the NRF 407. The security algorithm is sent then further together with the key $K_{TC}$ to the data consumer #1 401 and data producer 411.

In one embodiment, at step 7 (see messaging 414), the DCCF 405 registers the data consumer #1 401 at the messaging framework 409 for notifications corresponding to the data tag.

In one embodiment, at step 8 (see messaging 416), the DCCF 405 sends a service request message to retrieve data from the data producer 411 including the data tag and the key $K_{TC}$.

In one embodiment, at step 9 (see messaging 418), the data producer 411 may initialize the COUNTER$_{TC}$ at this point in time and sends a service response message back to the DCCF 405.

In one embodiment, at step 10 (see messaging 420), the DCCF 405 sends a data exposure response to the data consumer #1 401 including the data tag and the key $K_{TC}$.

In one embodiment, at step 11 (see block 422), upon reception of the key $K_{TC}$, the data consumer #1 401 initializes a corresponding COUNTER$_{TC}$.

In one embodiment, at step 12 (see block 424), an event with respect to the data tag occurs and the data producer 411 includes the event data in a TC for transmission via the messaging framework 409. The data producer 411 encrypts the TC with the $K_{TC}$, and integrity protects the TC with a MAC-I$_{TC}$ e.g., in a similar manner as the SoR-MAC-I$_{AUSF}$ as defined in Annex A.17 of TS 33.501. The MAC-I$_{TC}$ is based on the payload, e.g., the TC of the NF service request (e.g., EventExposure_Notify service operation) message, which form the input TC data, a counter of the NF service request (e.g., EventExposure_Notify service operation) messages COUNTER$_{TC}$, and the key $K_{TC}$ to the key derivation function ("KDF"). Alternatively, instead of the TC, the full NF service request message may be used as data input to compute the MAC-I$_{TC}$, accordingly the data consumer 401, 403 would have to do the same. The MAC-I$_{TC}$ is identified with the 128 least significant bits of the output of the KDF. The data producer 411 monotonically increments COUNTER$_{TC}$ for each additional calculated MAC-I$_{TC}$.

In one embodiment, at step 13 (see messaging 426), the data producer 411 sends the requested data in an NF service request (e.g., EventExposure_Notify service operation) with the protected TC to the messaging framework. The message may include the data tag corresponding to the event.

In one embodiment, at step 14 (see messaging 428), the messaging framework 409 identifies the data consumer 401, 403 subscribed to the data tag and sends a requested data in an NF service request (e.g., EventExposure_Notify service operation) including the protected TC to the data consumer #1 401.

In one embodiment, at step 15 (see block 430), the data consumer 401, 403 verifies the MAC-I$_{TC}$ of the NF service request (e.g., EventExposure_Notify service operation), e.g., it selects the key K$_{TC}$ based on the data tag and computes with the key K$_{TC}$ the MAC-I over the NF service request (e.g., EventExposure_Notify service operation) payload, e.g., the TC, in the similar way as the data producer 411 and compares the result with the MAC-I$_{TC}$ included in message. If both are identical, then the message was not modified by the messaging framework 409. The data consumer #1 401 decrypts the TC with the key K$_{TC}$ and monotonically increments COUNTER$_{TC}$.

In one embodiment, at step 16 (see messaging 432), data consumer #2 403 sends a subscribe message to the same data tag as previously data consumer #1 401.

In one embodiment, at step 17 (see block 434), the DCCF 405 checks whether there is already a notification service running for the requested data tag and identifies the binding of data consumer #1 401 and the data producer 411 and adds the data consumer #1 401 to the binding.

In one embodiment, at step 18 (see messaging 436), the DCCF 405 sends a key refresh trigger message for the data tag to the NRF 407.

In one embodiment, at step 19 (see block 438), the NRF 407 performs a key refresh procedure as described below with reference to FIG. 5.

In one embodiment, at step 20 (see messaging 440), the DCCF 405 registers the data consumer #2 403 at the messaging framework for notifications corresponding to the data tag.

In one embodiment, at step 21 (see block 442), an event with respect to the data tag occurs and the data producer 411 includes the event data in a TC for transmission via the messaging framework 409. The data producer 411 encrypts the TC with the K$_{TC}$, and integrity protects the TC with a MAC-I$_{TC}$ e.g., in a similar manner as the SoR-MAC-I$_{AUSF}$ as defined in Annex A.17 of TS 33.501. The MAC-I$_{TC}$ is based on the payload, e.g., the TC of the NF service request (e.g., EventExposure_Notify service operation) message, which form the input TC data, a counter of the NF service request (e.g., EventExposure_Notify service operation) messages COUNTER$_{TC}$, and the key K$_{TC}$ to the KDF. Alternatively, instead of the TC the full NF service request message may be used as data input to compute the MAC-I$_{TC}$, accordingly the data consumer 401, 403 would have to do the same. Alternatively, instead of the TC, the full NF service request message may be used as data input to compute the MAC-I$_{TC}$, accordingly the data consumer 401, 403 would have to do the same. The MAC-I$_{TC}$ is identified with the 128 least significant bits of the output of the KDF. The data producer 411 monotonically increments COUNTER$_{TC}$ for each additional calculated MAC-I$_{TC}$.

In one embodiment, at step 22 (see messaging 444), the data producer 411 sends the requested data in an NF service request (e.g., EventExposure_Notify service operation) with the protected TC to the messaging framework 409. The message may include the data tag corresponding to the event.

In one embodiment, at step 23 (see messaging 446), the messaging framework 409 identifies the data consumers #1 401 and #2 403 subscribed to the data tag and sends a requested data in an NF service request (e.g., EventExposure_Notify service operation) including the protected TC to the data consumers #1 401 and #2 403.

In one embodiment, at step 24 (see blocks 450, 452), the data consumers 401, 403 verify the MAC-I$_{TC}$ of the NF service request (e.g., EventExposure_Notify service operation), e.g., they select the key K$_{TC}$ based on the data tag and compute with the key K$_{TC}$ the MAC-I over the NF service request payload (e.g., EventExposure_Notify service operation), e.g., the TC, in the similar way as the data producer 411 and compare the result with the MAC-I$_{TC}$ included in message. If both are identical, then the message was not modified by the messaging framework 409. The data consumers 401, 403 decrypt the TC with the key K$_{TC}$ and monotonically increment COUNTER$_{TC}$.

As a variation of above embodiment, the NRF 407 may generate asymmetric keys for the data producer 411 and the data consumer 401, 403, e.g., a public key provisioned to the data producer 411 for encryption and integrity protection and a private key for the data consumers 401, 403 for decryption.

Figure 5:
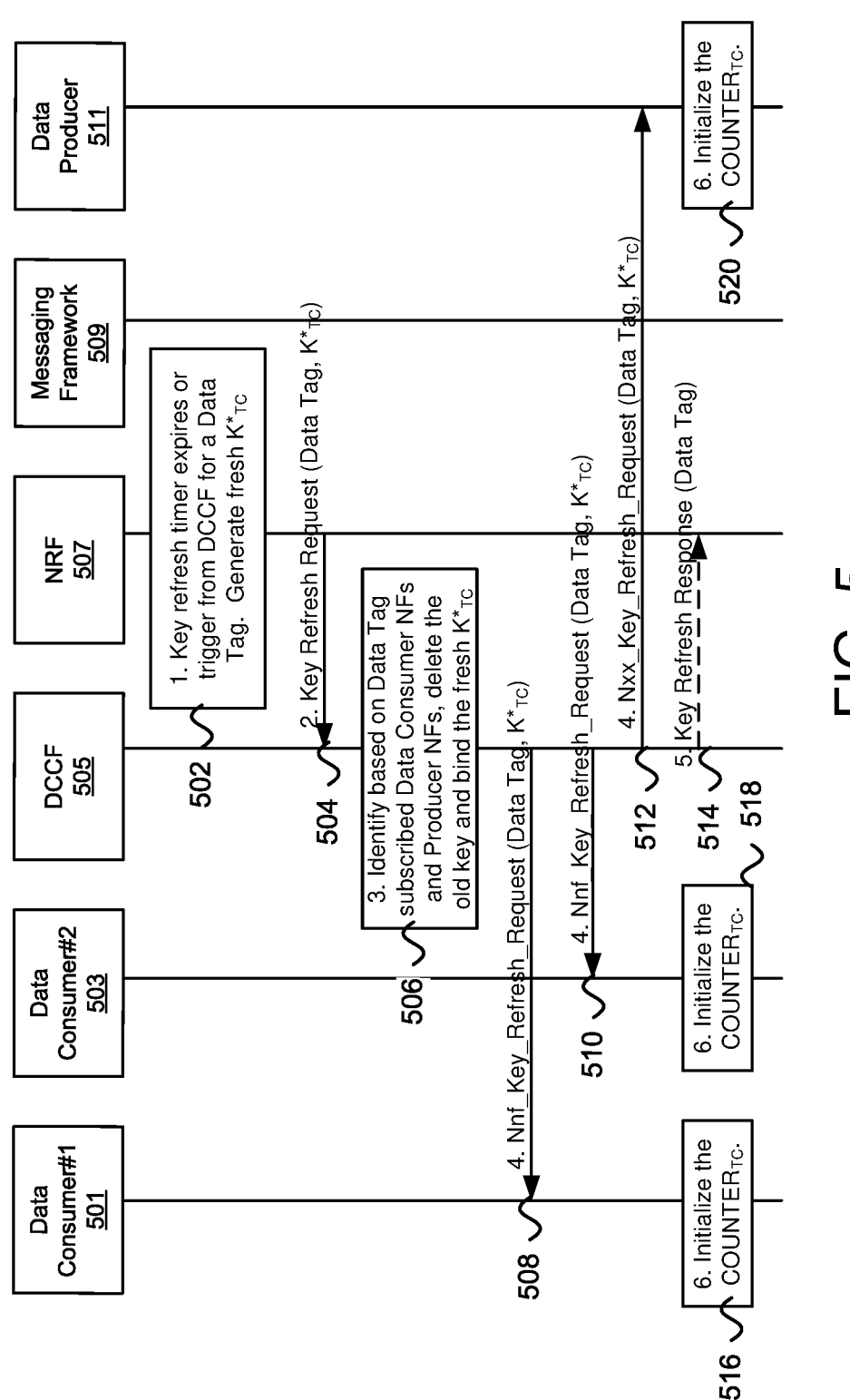
FIG. 5 is an embodiment of an NRF-initiated key refresh.

FIG. 5 depicts the NRF-initiated key refresh procedure. Since the key K$_{TC}$ is shared between several data consumers and data producers, it is recommended to frequently change the key either with a limited lifetime or at a change of data consumers subscribing to the events of a specific data tag.

In one embodiment, at step 1 (see block 502), the NRF 507 receives a key refresh trigger from the DCCF 505 or the K$_{TC}$ refresh timer for a specific data tag expires/reaches the value of the key lifetime. The NRF 507 generates a fresh K*$_{TC}$. The NRF 507 may select the security algorithm, if not preconfigured in the NFs, which is sent then further together with the key K$_{TC}$ to the data consumer 501, 503 and data producer 511.

In one embodiment, at step 2 (see messaging 504), the NRF 507 sends a key refresh request to the DCCF 505 including the data tag and the K*$_{TC}$.

In one embodiment, at step 3 (see block 506), the DCCF 505 identifies based on the data tag the subscribed data consumer NFs and the data producer NF. The DCCF 505 deletes the old key K$_{TC}$ and binds the new key K*$_{TC}$ to the involved NFs of the data tag. The DCCF 505 may select the security algorithm, if not preconfigured in the NFs or already selected by the NRF 507. The security algorithm is sent then further together with the key K$_{TC}$ to the data consumer 501, 503 and data producer 511.

In one embodiment, at step 4 (see messaging 508, 510, 512), the DCCF 505 sends a key refresh request to all data consumer NFs 501, 503 and the data producer NF 511 including the data tag and the new key K*$_{TC}$.

In one embodiment, at step 5 (see messaging 514), in case step 1 was initiated by the NRF 507 without trigger from the DCCF 505 before (e.g., FIG. 4B, step 18), e.g., based on NRF internal logic, e.g., a timer, then the DCCF 505 acknowledges the successful key refresh to the NRF 507.

In one embodiment, at step 6 (see blocks 516, 518, 520), the data consumers 501, 503 may store the old COUNTER$_{TC}$ as well as the old K$_{TC}$ in case it subscribed not to real time notifications and retrieves the event notifications from the messaging framework 509 in certain intervals. In this case, the data consumers 501, 503 may store the old COUNTER$_{TC}$ and old K$_{TC}$ for the duration of this interval or until the next event notification from the messaging framework 509 in case the TC was protected with the old K$_{TC}$ and the old COUNTER$_{TC}$ value.

As a variation of the key refresh procedure, the NRF 507 may generate asymmetric keys for the data producer 511 and the data consumer 501, 503, e.g., a public key provisioned to the data producer 511 for encryption and integrity protection and a private key for the data consumers 501, 503 for decryption.

Figure 6A:
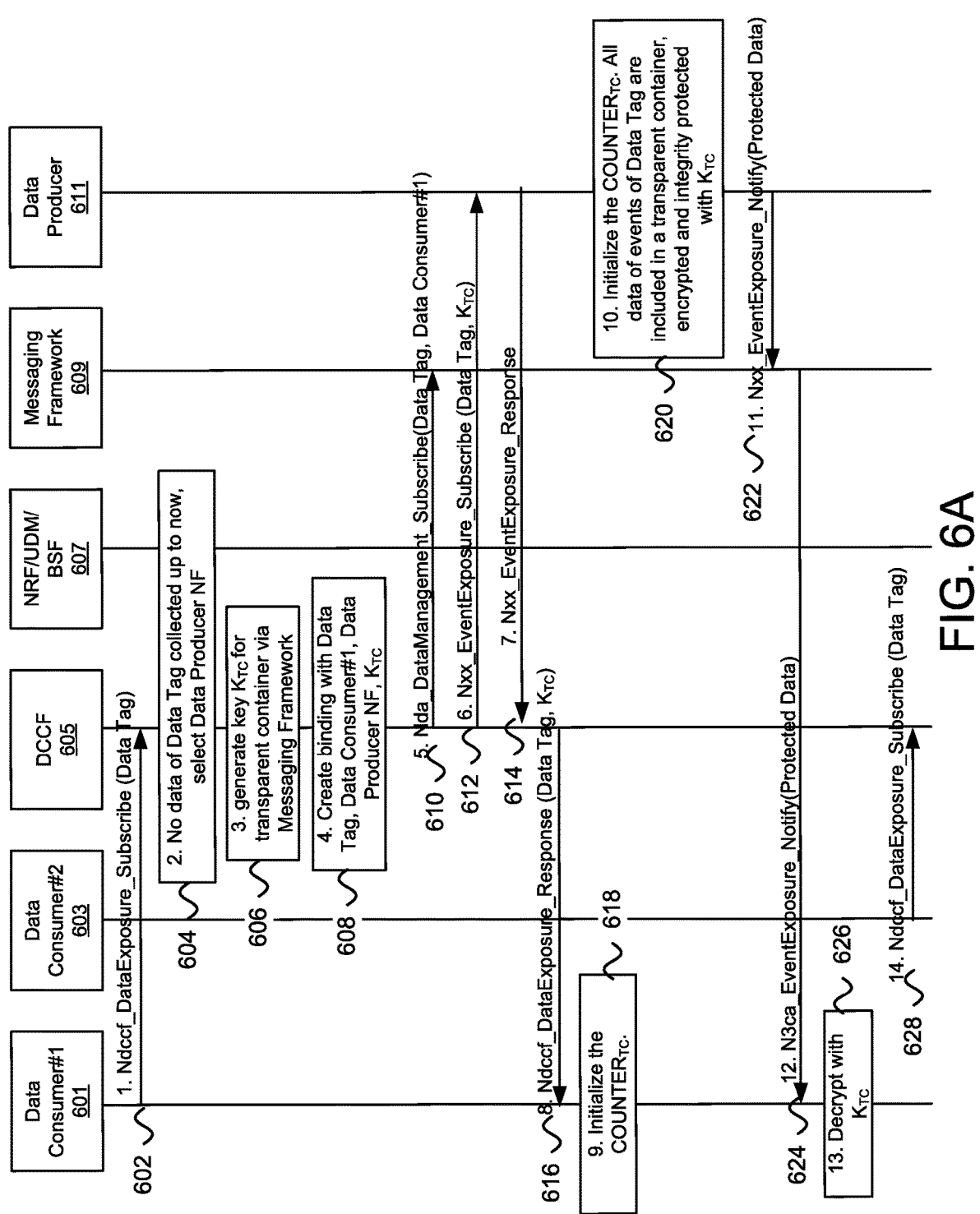
FIG. 6A is a first variation of an embodiment of key handling in a data collection coordination function ("DCCF")
Figure 6B:
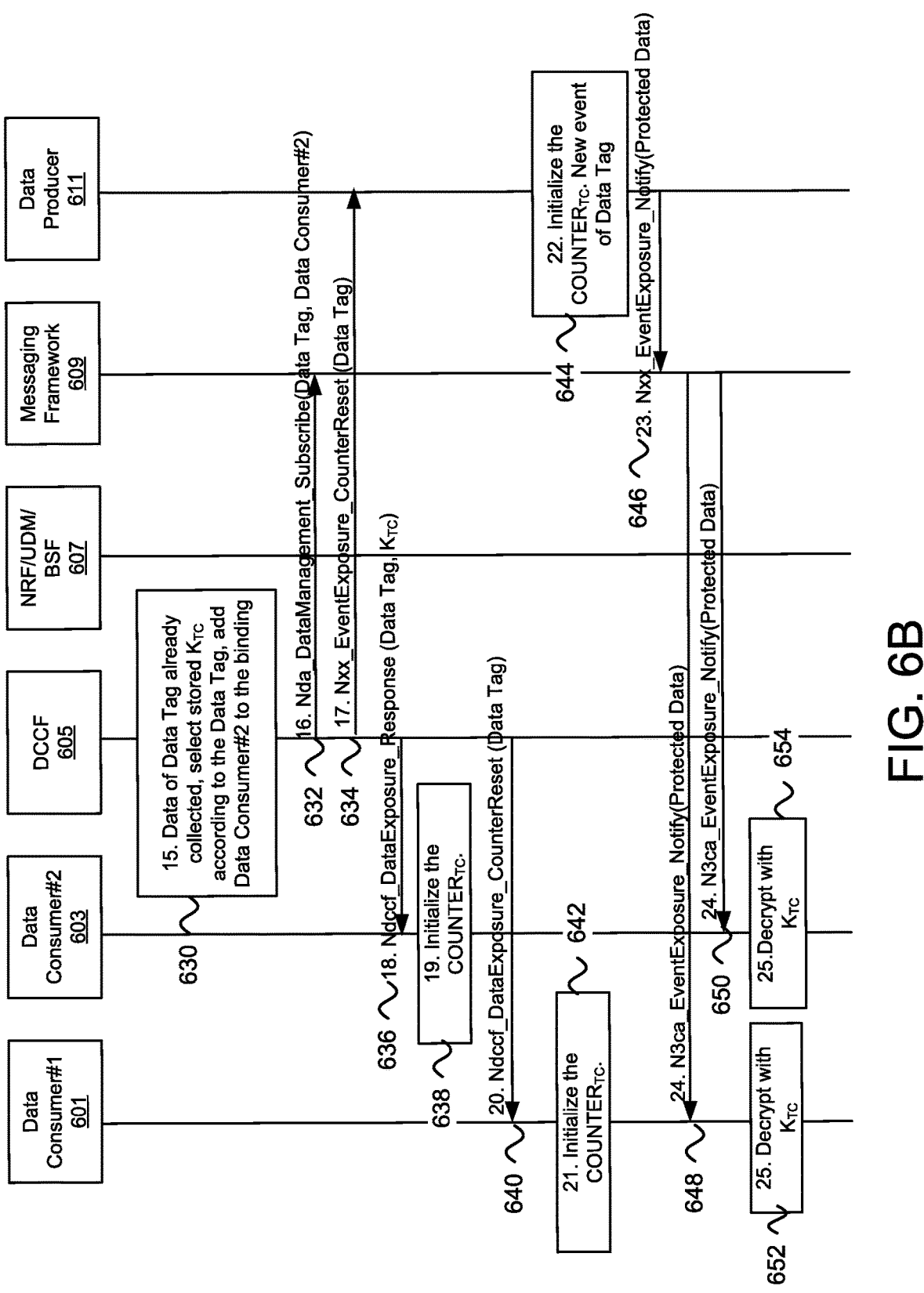
FIG. 6B is a continuation of FIG. 6A.

In a second embodiment, the key handling is performed at the DCCF in two variations, in variation #1, shown in FIGS. 6A and 6B, only the COUNTER$_{TC}$ for generating the MAC-I of the TC is initialized every time a new data consumer joins to subscribe to the event data from the data producer. In variation #2, shown in FIGS. 7A and 7B, the key refresh procedure is performed so that a fresh key K$_{TC}$ is also provided to all involved network functions.

In the first variation, shown in FIGS. 6A-6B, in one embodiment, at step 1 (see messaging 602), the data consumer #1 601 subscribes for data notifications for a specific data tag. The data tag includes information to identify the data required (e.g., a set of Event ID(s) from data producer NF 611), information to identify the UE (single UE, group of UE(s) or any UE), optionally information to identify the data producer, and filtering information such as location area or time of day where data is required from.

In one embodiment, at step 2 (see block 604), the DCCF 605 checks whether there is already a notification service running for the requested data tag. If not, the DCCF 605 requests from the NRF/UDM/binding support function ("BSF") 607 the data producer 611 corresponding to the data tag.

In one embodiment, at step 3 (see block 606), the DCCF 605 generates a fresh key K$_{TC}$ for the data tag. K$_{TC}$ is used later by the data producer 611 to protect the TC that contains the requested event data and is sent via the messaging framework 609. The DCCF 605 may select the security algorithm, if not preconfigured in the NFs or already selected by the NRF 607. The security algorithm is sent together with the key K$_{TC}$ to the data consumer 601, 603 and data producer 611.

In one embodiment, at step 4 (see block 608), the DCCF 605 creates a binding based on the data tag with the key K$_{TC}$, the data consumer #1 601, and the data producer 611. This is important so that the DCCF 605 knows which network functions are involved for a specific data tag in case the COUNTER$_{TC}$ or the K$_{TC}$ or both need to be updated.

In one embodiment, at step 5 (see messaging 610), the DCCF 605 registers the data consumer #1 601 at the messaging framework for notifications corresponding to the data tag.

In one embodiment, at step 6 (see messaging 612), the DCCF 605 sends a service request message to retrieve data from the data producer 611 including the data tag and the key K$_{TC}$.

In one embodiment, at step 7 (see messaging 614), the data producer 611 may initialize the COUNTER$_{TC}$ at this point in time and sends a service response message back to the DCCF 605.

In one embodiment, at step 8 (see messaging 616), the DCCF 605 sends a data exposure response to the data consumer #1 601 including the data tag and the key K$_{TC}$.

In one embodiment, at step 9 (see block 618), upon reception of the key K$_{TC}$, the data consumer #1 601 initializes a corresponding COUNTER$_{TC}$.

In one embodiment, at step 10 (see block 620), an event with respect to the data tag occurs and the data producer 611 includes the event data in a TC for transmission via the messaging framework 609. The data producer 611 encrypts the TC with the K$_{TC}$, and integrity protects the TC with a MAC-I$_{TC}$ e.g., in a similar manner as the SoR-MAC-I$_{AUSF}$ as defined in Annex A.17 of TS 33.501. The MAC-I$_{TC}$ is based on the payload, e.g., the TC of the NF service request (e.g., EventExposure_Notify service operation) message, which form the input TC data, a counter of the NF service request (e.g., EventExposure_Notify service operation) messages COUNTER$_{TC}$, and the key K$_{TC}$ to the KDF. Alternatively, instead of the TC, the full NF service request message may be used as data input to compute the MAC-I$_{TC}$, accordingly the data consumer 601, 603 would have to do the same. The MAC-I$_{TC}$ is identified with the 128 least significant bits of the output of the KDF. The data producer 611 monotonically increments COUNTER$_{TC}$ for each additional calculated MAC-I$_{TC}$.

In one embodiment, at step 11 (see messaging 622), the data producer 611 sends the requested data in an NF service request (e.g., EventExposure_Notify service operation) with the protected TC to the messaging framework 609. The message may include the data tag corresponding to the event.

In one embodiment, at step 12 (see messaging 624), the messaging framework 609 identifies the data consumer 611 subscribed to the data tag and sends a requested data in an NF service request (e.g., EventExposure_Notify service operation) including the protected TC to the data consumer #1 601.

In one embodiment, at step 13 (see block 626), the data consumer 601, 603 verifies the MAC-I$_{TC}$ of the NF service request (e.g., EventExposure_Notify service operation) message, e.g., it selects the key K$_{TC}$ based on the data tag and computes with the key K$_{TC}$ the MAC-I over the NF service request (e.g., EventExposure_Notify service operation) payload, e.g., the TC, in the similar way as the data producer 611 and compares the result with the MAC-I$_{TC}$ included in message. If both are identical, then the message was not modified by the messaging framework 609. The data consumer #1 601 decrypts the TC with the key K$_{TC}$ and monotonically increments COUNTER$_{TC}$.

In one embodiment, at step 14 (see messaging 628), data consumer #2 603 sends a subscribe message to the same data tag as previously data consumer #1 601.

In one embodiment, at step 15 (see block 630), the DCCF 605 checks whether there is already a notification service running for the requested data tag and identifies the binding of data consumer #1 601 and the data producer 611 and adds the data consumer #1 601 to the binding.

In one embodiment, at step 16 (see messaging 632), the DCCF 605 registers the data consumer #2 603 at the messaging framework for notifications corresponding to the data tag.

In one embodiment, at step 17 (see messaging 634), the DCCF 605 sends a CounterReset message to the data producer 611, which may directly initialize the COUNTER$_{TC}$ for the data tag.

In one embodiment, at step 18 (see messaging 636), the DCCF 605 sends a data exposure response to the data consumer #2 603 including the data tag and the key $K_{TC}$.

In one embodiment, at step 19 (see block 638), upon reception of the key $K_{TC}$, the data consumer #2 603 initializes a corresponding $COUNTER_{TC}$.

In one embodiment, at step 20 (see messaging 640), the DCCF 605 sends a CounterReset message to the data consumer #1 601.

In one embodiment, at step 21 (see block 642), upon reception of the key $K_{TC}$, the data consumer #1 604 initializes a corresponding $COUNTER_{TC}$. The data consumer #1 604 may store the old $COUNTER_{TC}$ in case it subscribed not to real time notifications and retrieves the event notifications always from the messaging framework in certain intervals. In this case, the data consumer #1 601 may store the old $COUNTER_{TC}$ for the duration of this interval or until the next event notification from the messaging framework in case the $MAC\text{-}I_{TC}$ was still computed with the old $COUNTER_{TC}$ value.

In one embodiment, at step 22 (see block 644), an event with respect to the data tag occurs and the data producer 611 includes the event data in a TC for transmission via the messaging framework 609. The data producer 611 encrypts the TC with the $K_{TC}$, and integrity protects the TC with a $MAC\text{-}I_{TC}$ e.g., in a similar manner as the $SoR\text{-}MAC\text{-}I_{AUSF}$ as defined in Annex A.17 of TS 33.501. The $MAC\text{-}I_{TC}$ is based on the payload, e.g., the TC of the NF service request (e.g., EventExposure_Notify service operation) message, which form the input TC data, a counter of the NF service request (e.g., EventExposure_Notify service operation) messages $COUNTER_{TC}$, and the key $K_{TC}$ to the KDF. Alternatively, instead of the TC, the full NF service request message may be used as data input to compute the $MAC\text{-}I_{TC}$, accordingly the data consumer 601, 603 would have to do the same. The $MAC\text{-}I_{TC}$ is identified with the 128 least significant bits of the output of the KDF. The data producer monotonically increments $COUNTER_{TC}$ for each additional calculated $MAC\text{-}I_{TC}$.

In one embodiment, at step 23 (see messaging 646), the data producer 611 sends the requested data in an NF service request (e.g., EventExposure_Notify service operation) with the protected TC to the messaging framework. The message may include the data tag corresponding to the event.

In one embodiment, at step 24 (see messaging 648, 650), the messaging framework 609 identifies the data consumers #1 601 and #2 603 subscribed to the data tag and sends a requested data in an NF service request (e.g., EventExposure_Notify service operation) including the protected TC to the data consumers #1 601 and #2 603.

In one embodiment, at step 25 (see blocks 652, 654), the data consumers 601, 603 verify the $MAC\text{-}I_{TC}$ of the NF service request (e.g., EventExposure_Notify service operation), e.g., they select the key $K_{TC}$ based on the data tag and compute with the key $K_{TC}$ the MAC-I over the NF service request payload (e.g., EventExposure_Notify service operation), e.g., the TC, in the similar way as the data producer 611 and compare the result with the $MAC\text{-}I_{TC}$ included in message. If both are identical, then the message was not modified by the messaging framework 609. The data consumers 601, 603 decrypt the TC with the key $K_{TC}$ and monotonically increment $COUNTER_{TC}$.

As a variation of the above embodiment, the DCCF 605 may generate asymmetric keys for the data producer 611 and the data consumers 601, 603, e.g., a public key provisioned to the data producer 611 for encryption and integrity protection and a private key for the data consumers 601, 603 for decryption.

Figure 7A:
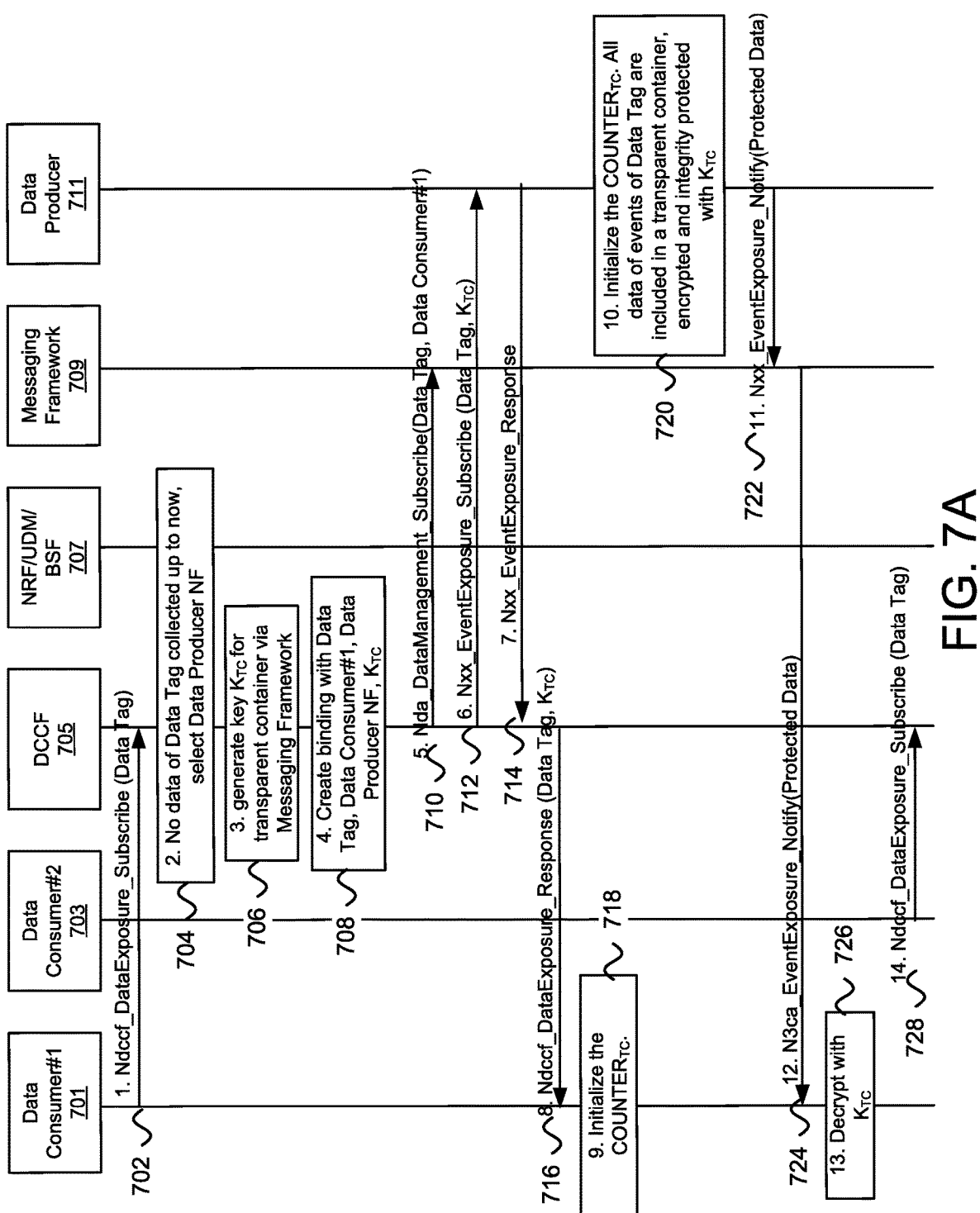
FIG. 7A is a second variation of an embodiment of key handling in the DCCF.
Figure 7B:
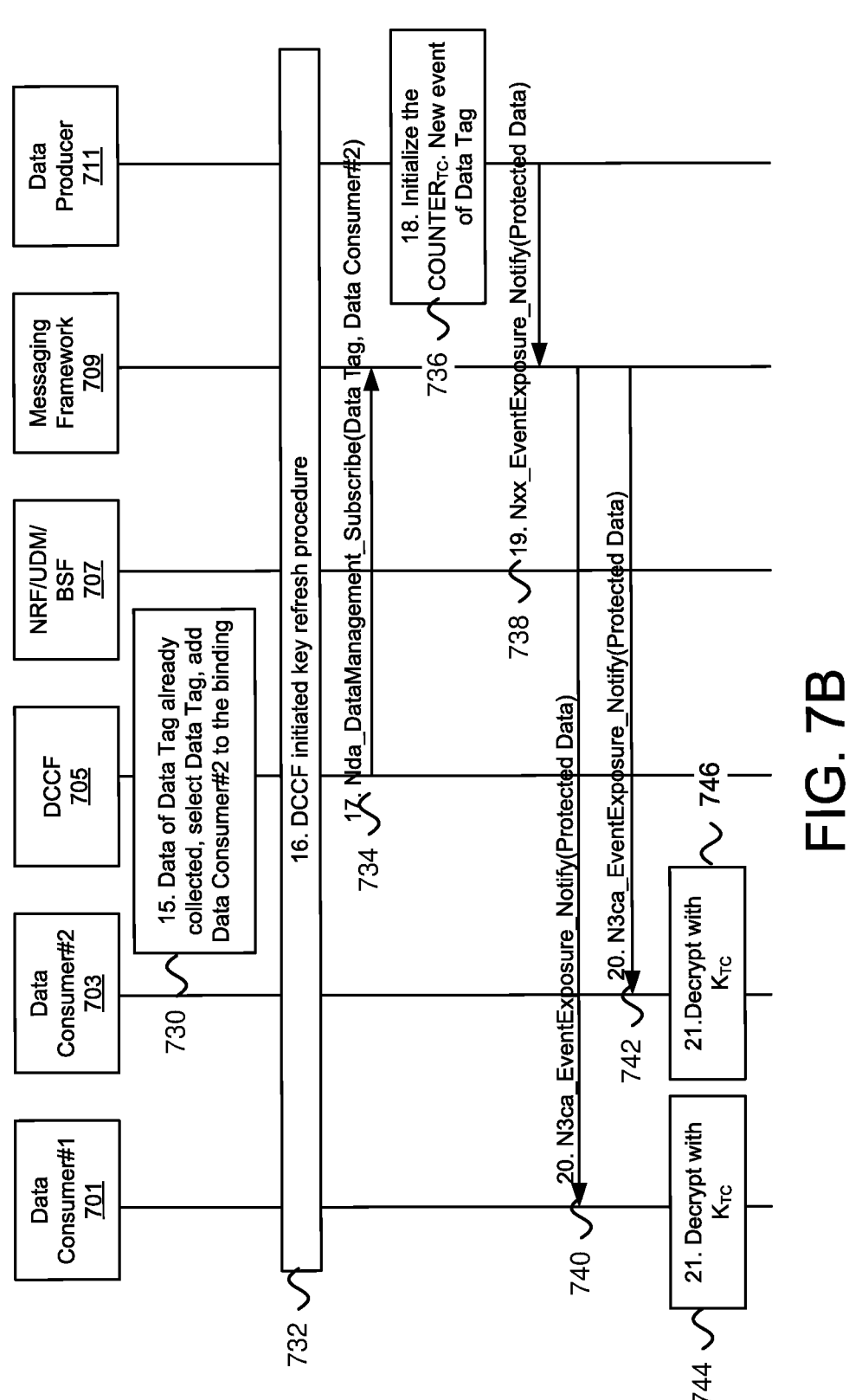
FIG. 7B is a continuation of FIG. 7A.

A second variation of the foregoing embodiment, depicted in FIGS. 7A-7B, describes the key exchange with the key refresh procedure when a new data consumer joins the same data tag notifications via the messaging framework.

In one embodiment, at step 1 (see messaging 702), the data consumer #1 701 subscribes for data notifications for a specific data tag. The data tag includes information to identify the data required (e.g., a set of Event ID(s) from data producer NF 711), information to identify the UE (single UE, group of UE(s) or any UE), optionally information to identify the data producer, and filtering information such as location area or time of day where data is required from.

In one embodiment, at step 2 (see block 704), the DCCF 705 checks whether there is already a notification service running for the requested data tag. If not, the DCCF 705 requests from the NRF/UDM/binding support function ("BSF") 707 the data producer 711 corresponding to the data tag.

In one embodiment, at step 3 (see block 706), the DCCF 705 generates a fresh key $K_{TC}$ for the data tag. $K_{TC}$ is used later by the data producer 711 to protect the TC that contains the requested event data and is sent via the messaging framework 709. The DCCF 705 may select the security to algorithm, if not preconfigured in the NFs or already selected by the NRF 707. The security algorithm is sent together with the key $K_{TC}$ to the data consumer 701, 703 and data producer 711.

In one embodiment, at step 4 (see block 708), the DCCF 705 creates a binding based on the data tag with the key $K_{TC}$, the data consumer #1 701, and the data producer 711. This is important so that the DCCF 705 knows which network functions are involved for a specific data tag in case the $COUNTER_{TC}$ or the $K_{TC}$ or both need to be updated.

In one embodiment, at step 5 (see messaging 710), the DCCF 705 registers the data consumer #1 701 at the messaging framework for notifications corresponding to the data tag.

In one embodiment, at step 6 (see messaging 712), the DCCF 705 sends a service request message to retrieve data from the data producer 711 including the data tag and the key $K_{TC}$.

In one embodiment, at step 7 (see messaging 714), the data producer 711 may initialize the $COUNTER_{TC}$ at this point in time and sends a service response message back to the DCCF 705.

In one embodiment, at step 8 (see messaging 716), the DCCF 705 sends a data exposure response to the data consumer #1 701 including the data tag and the key $K_{TC}$.

In one embodiment, at step 9 (see block 718), upon reception of the key $K_{TC}$, the data consumer #1 701 initializes a corresponding $COUNTER_{TC}$.

In one embodiment, at step 10 (see block 720), an event with respect to the data tag occurs and the data producer 711 includes the event data in a TC for transmission via the messaging framework 709. The data producer 711 encrypts the TC with the $K_{TC}$, and integrity protects the TC with a $MAC\text{-}I_{TC}$ e.g., in a similar manner as the $SoR\text{-}MAC\text{-}I_{AUSF}$ as defined in Annex A.17 of TS 33.501. The $MAC\text{-}I_{TC}$ is based on the payload, e.g., the TC of the NF service request (e.g., EventExposure_Notify service operation) message, which form the input TC data, a counter of the NF service request (e.g., EventExposure_Notify service operation) messages $COUNTER_{TC}$, and the key $K_{TC}$ to the KDF. Alternatively, instead of the TC, the full NF service request message may be used as data input to compute the MAC-$I_{TC}$, accordingly the data consumer 701, 703 would have to do the same. The MAC-$I_{TC}$ is identified with the 128 least significant bits of the output of the KDF. The data producer 711 monotonically increments $COUNTER_{TC}$ for each additional calculated MAC-$I_{TC}$.

In one embodiment, at step 11 (see messaging 722), the data producer 711 sends the requested data in an NF service request (e.g., EventExposure_Notify service operation) with the protected TC to the messaging framework 709. The message may include the data tag corresponding to the event.

In one embodiment, at step 12 (see messaging 724), the messaging framework 709 identifies the data consumer 711 subscribed to the data tag and sends a requested data in an NF service request (e.g., EventExposure_Notify service operation) including the protected TC to the data consumer #1 701.

In one embodiment, at step 13 (see block 726), the data consumer 701, 703 verifies the MAC-$I_{TC}$ of the NF service request (e.g., EventExposure_Notify service operation) message, e.g., it selects the key $K_{TC}$ based on the data tag and computes with the key $K_{TC}$ the MAC-I over the NF service request (e.g., EventExposure_Notify service operation) payload, e.g., the TC, in the similar way as the data producer 711 and compares the result with the MAC-$I_{TC}$ included in message. If both are identical, then the message was not modified by the messaging framework 709. The data consumer #1 701 decrypts the TC with the key $K_{TC}$ and monotonically increments $COUNTER_{TC}$.

In one embodiment, at step 14 (see messaging 728), data consumer #2 703 sends a subscribe message to the same data tag as previously data consumer #1 701.

In one embodiment, at step 15 (see block 730) the DCCF 705 checks whether there is already a notification service running for the requested data tag and identifies the binding of data consumer #1 701 and the data producer 711 and adds the data consumer #1 701 to the binding.

In one embodiment, at step 16 (see block 732), the DCCF 705 initiates a key refresh procedure for the data tag, as described below with reference to FIG. 8.

In one embodiment, at step 17 (see messaging 734), the DCCF 705 registers the data consumer #2 703 at the messaging framework 709 for notifications corresponding to the data tag.

In one embodiment, at step 18 (see block 736), an event with respect to the data tag occurs and the data producer 711 includes the event data in a TC for transmission via the messaging framework 709. The data producer 711 encrypts the TC with the $K_{TC}$, and integrity protects the TC with a MAC-$I_{TC}$ e.g., in a similar manner as the SoR-MAC-$I_{AUSF}$ as defined in Annex A.17 of TS 33.501. The MAC-$I_{TC}$ is based on the payload, e.g., the TC of the NF service request (e.g., EventExposure_Notify service operation) message, which form the input TC data, a counter of the NF service request (e.g., EventExposure_Notify service operation) messages $COUNTER_{TC}$, and the key $K_{TC}$ to the KDF. Alternatively, instead of the TC, the full NF service request message may be used as data input to compute the MAC-$I_{TC}$, accordingly the data consumer 701, 703 would have to do the same. The MAC-$I_{TC}$ is identified with the 128 least significant bits of the output of the KDF. The data producer 711 monotonically increments $COUNTER_{TC}$ for each additional calculated MAC-$I_{TC}$.

In one embodiment, at step 19 (see messaging 738), the data producer 711 sends the requested data in an NF service request (e.g., EventExposure_Notify service operation) with the protected TC to the messaging framework 709. The message may include the data tag corresponding to the event.

In one embodiment, at step 20 (see messaging 740, 742), the messaging framework 709 identifies the data consumers #1 701 and #2 703 subscribed to the data tag and sends a requested data in an NF service request (e.g., EventExposure_Notify service operation) including the protected TC to the data consumers #1 701 and #2 703.

In one embodiment, at step 21 (see block 744, 746), the data consumers 701, 703 verify the MAC-$I_{TC}$ of the NF service request (e.g., EventExposure_Notify service operation), e.g., they select the key $K_{TC}$ based on the data tag and compute with the key $K_{TC}$ the MAC-I over the NF service request payload (e.g., EventExposure_Notify service operation), e.g., the TC, in the similar way as the data producer 711 and compare the result with the MAC-$I_{TC}$ included in message. If both are identical, then the message was not modified by the messaging framework 709. The data consumers 701, 703 decrypt the TC with the key $K_{TC}$ and monotonically increment $COUNTER_{TC}$.

As a variation of the above embodiment, the DCCF 705 may generate asymmetric keys for the data producer 711 and the data consumer 701, 703, e.g., a public key provisioned to the data producer 711 for encryption and integrity protection and a private key for the data consumers 701, 703 for decryption.

Figure 8:
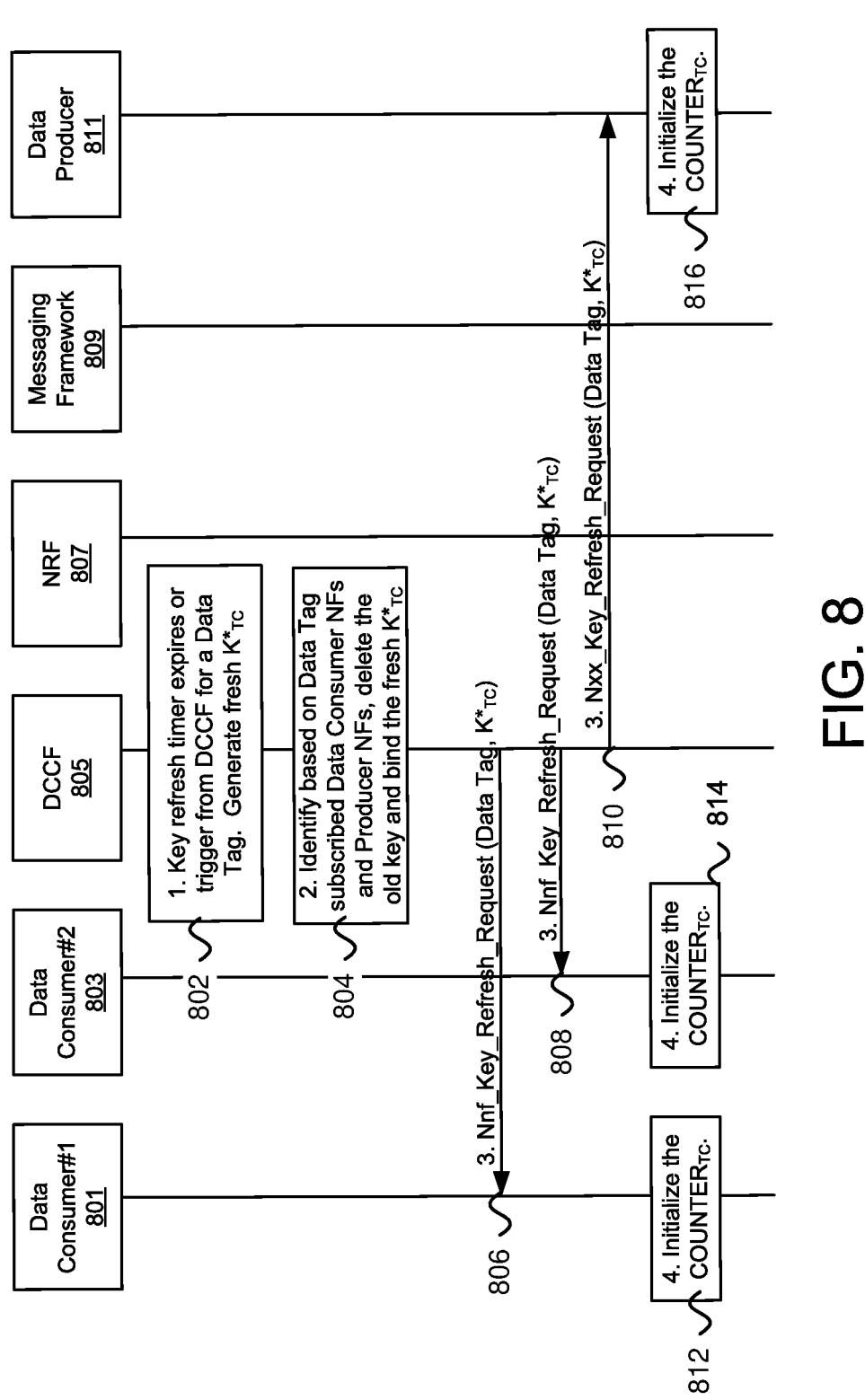
FIG. 8 is an embodiment of DCCF-initiated key refresh.

FIG. 8 depicts a DCCF-initiated key refresh procedure. Since the key $K_{TC}$ is shared between several data consumers and data producers, it is recommended to frequently change the key either with a limited lifetime or at a change of data consumers subscribing to the events of a specific data tag.

In one embodiment, at step 1 (see block 802), the DCCF 805 receives a new subscription request from a data consumer 801, 803 to an existing event notification for a specific data tag or the $K_{TC}$ refresh timer for a specific data tag expires/reaches the value of the key lifetime. The DCCF 805 generates a fresh $K^*_{TC}$. The DCCF 805 may select the security algorithm, if not preconfigured in the NFs or already selected by the NRF 807. The security algorithm is sent then further together with the key $K_{TC}$ to the data consumer 801, 803 and data producer 811.

In one embodiment, at step 2 (see block 804), the DCCF 805 identifies, based on the data tag, the subscribed data consumer NFs 801, 803 and the data producer NF 811. The DCCF 805 deletes the old key $K_{TC}$ and binds the new key $K^*_{TC}$ to the involved NFs of the data tag.

In one embodiment, at step 3 (see messaging 806, 808, 810), the DCCF 805 sends a key refresh request to all data consumer NFs 801, 803 and the data producer NF 811 including the data tag and the new key $K^*_{TC}$.

In one embodiment, at step 4 (see block 812, 814, 816), the data consumers 801, 803 may store the old $COUNTER_{TC}$ as well as the old $K_{TC}$ in case it subscribed not to real time notifications and retrieves the event notifications always from the messaging framework 809 in certain intervals. In this case, the data consumers 801, 803 may store the old $COUNTER_{TC}$ and old $K_{TC}$ for the duration of this interval or until the next event notification from the messaging framework 809 in case the TC was protected with the old $K_{TC}$ and the old $COUNTER_{TC}$ value.

As a variation of the key refresh procedure described above, the DCCF 805 may generate asymmetric keys for the data producer 811 and the data consumer 801, 803, e.g., a public key provisioned to the data producer 811 for encryption and integrity protection and a private key for the data consumers 801, 803 for decryption.

Figure 9A:
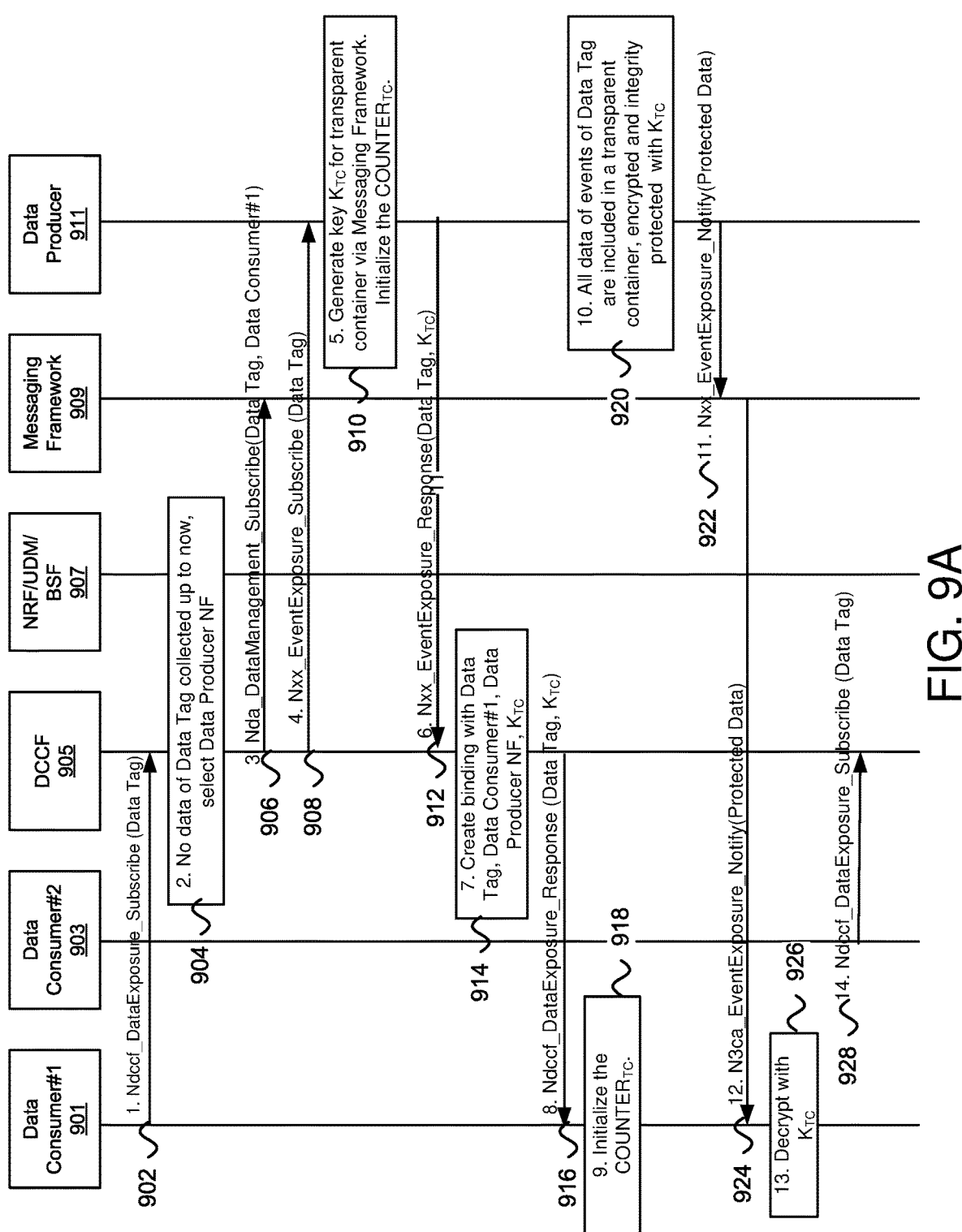
FIG. 9A is a first variation of an embodiment of key handling in a data producer.
Figure 9B:
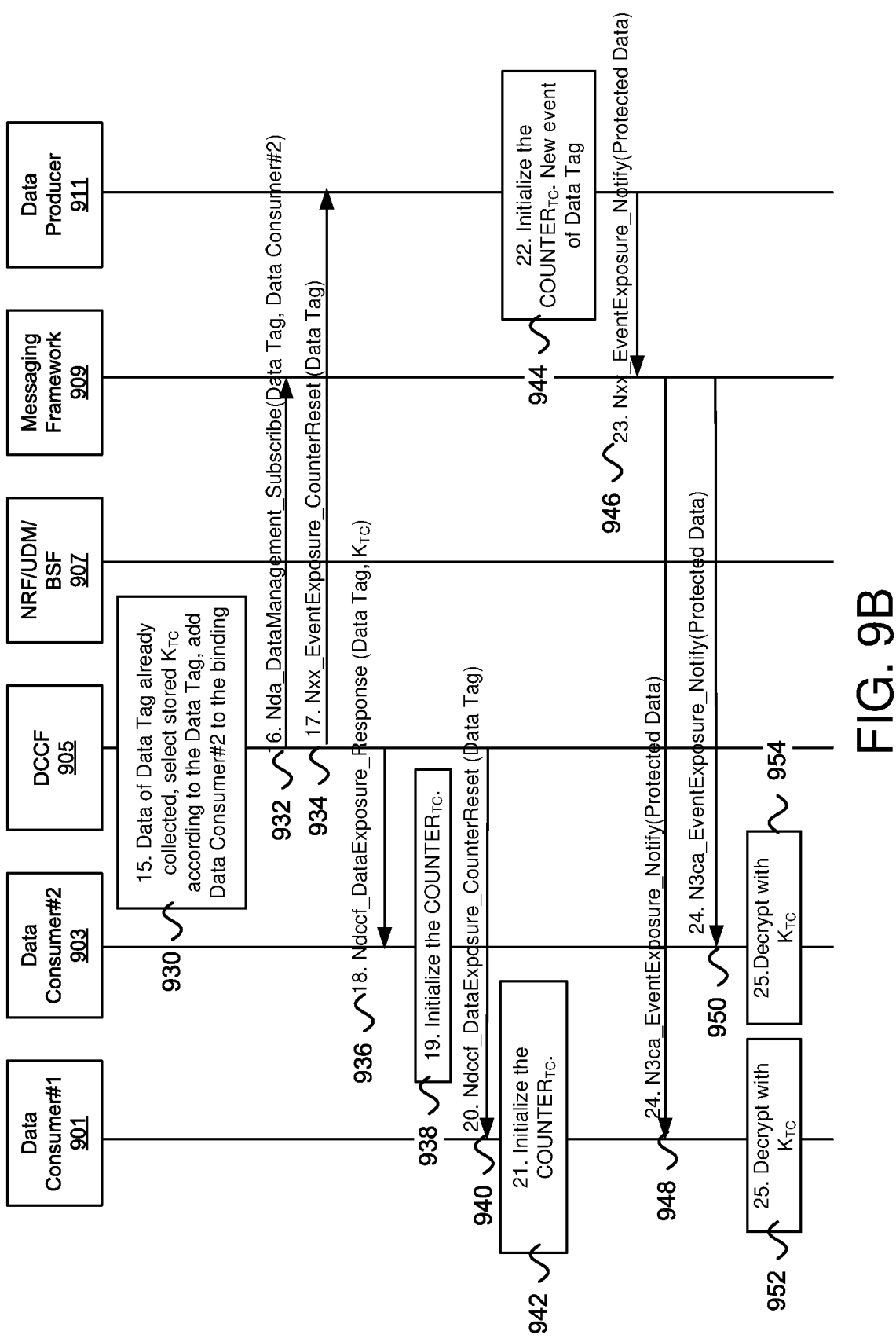
FIG. 9B is a continuation of FIG. 9A.

In another embodiment, key handing in the data producer is described in two variations, in variation #1, shown in FIGS. 9A and 9B, only the COUNTER$_{TC}$ for generating the MAC-I of the TC is initialized every time a new data consumer joins to subscribe to the event data from the data producer. In variation #2, shown in FIGS. 10A and 10B the key refresh procedure is performed so that in addition also a fresh key K$_{TC}$ is provided to all involved network functions.

In a first variation, shown in FIGS. 9A-9B, in one embodiment, at step 1 (see messaging 902), the data consumer #1 901 subscribes for data notifications for a specific data tag. The data tag includes information to identify the data required (e.g., a set of Event ID(s) from data producer NF), information to identify the UE (single UE, group of UE(s) or any UE), optionally information to identify the data producer 911, and filtering information such as location area or time of day where data is required from.

In one embodiment, at step 2 (see block 904), the DCCF 905 checks whether there is already a notification service running for the requested data tag. If not, the DCCF 905 requests from the NRF/UDM/BSF 907 the data producer 911 corresponding to the data tag.

In one embodiment, at step 3 (see messaging 906), the DCCF 905 registers the data consumer #1 901 at the messaging framework 909 for notifications corresponding to the data tag.

In one embodiment, at step 4 (see messaging 908), the DCCF 905 sends a service request message to retrieve data from the data producer 911 including the data tag.

In one embodiment, at step 5 (see block 910), the data producer 911 may initialize the COUNTER$_{TC}$ at this point and generates a fresh key K$_{TC}$ for the data tag. K$_{TC}$ is used later by the data producer 911 to protect the TC that contains the requested event data and is sent via the messaging framework. The data producer 911 may select the security algorithm, if not preconfigured in the NFs or already selected by the NRF 907 or DCCF 905. The security algorithm is sent then further together with the key K$_{TC}$ to the data consumer 901, 903.

In one embodiment, at step 6 (see messaging 912), the data producer 911 sends a service response message back to the DCCF 905 including the data tag and the key K$_{TC}$.

In one embodiment, at step 7 (see block 914), the DCCF 905 creates a binding based on the data tag with the key K$_{TC}$, the data consumer #1 901, and the data producer 911. This is important so that the DCCF 905 always knows which network functions are involved for a specific data tag in case the COUNTER$_{TC}$ or the K$_{TC}$ or both need to be updated.

In one embodiment, at step 8 (see messaging 916), the DCCF 905 sends a data exposure response to the data consumer #1 901 including the data tag and the key K$_{TC}$.

In one embodiment, at step 9 (see block 918), upon reception of the key K$_{TC}$, the data consumer #1 901 initializes a corresponding COUNTER$_{TC}$.

In one embodiment, at step 10 (see block 920), an event with respect to the data tag occurs and the data producer 911 includes the event data in a TC for transmission via the messaging framework 909. The data producer 911 encrypts the TC with the K$_{TC}$, and integrity protects the TC with a MAC-I$_{TC}$ e.g., in a similar manner as the SoR-MAC-I$_{AUSF}$ as defined in Annex A.17 of TS 33.501. The MAC-I$_{TC}$ is based on the payload, e.g., the TC of the NF service request (e.g., EventExposure_Notify service operation) message, which form the input TC data, a counter of the NF service request (e.g., EventExposure_Notify service operation) messages COUNTER$_{TC}$, and the key K$_{TC}$ to the KDF.

Alternatively, instead of the TC, the full NF service request message may be used as data input to compute the MAC-I$_{TC}$, accordingly the data consumer 901, 903 would have to do the same. The MAC-I$_{TC}$ is identified with the 128 least significant bits of the output of the KDF. The data producer 911 monotonically increments COUNTER$_{TC}$ for each additional calculated MAC-I$_{TC}$.

In one embodiment, at step 11 (see messaging 922), the data producer 911 sends the requested data in an NF service request (e.g., EventExposure_Notify service operation) with the protected TC to the messaging framework 909. The message may include the data tag corresponding to the event.

In one embodiment, at step 12 (see messaging 924), the messaging framework 909 identifies the data consumer 901, 903 subscribed to the data tag and sends a requested data in an NF service request (e.g., EventExposure_Notify service operation) including the protected TC to the data consumer #1 901.

In one embodiment, at step 13 (see block 926), the data consumer 901, 903 verifies the MAC-I$_{TC}$ of the NF service request (e.g., EventExposure_Notify service operation) message, e.g., it selects the key K$_{TC}$ based on the data tag and computes with the key K$_{TC}$ the MAC-I over the NF service request (e.g., EventExposure_Notify service operation) payload, e.g., the TC, in the similar way as the data producer 911 and compares the result with the MAC-I$_{TC}$ included in message. If both are identical, then the message was not modified by the messaging framework 909. The data consumer #1 901 decrypts the TC with the key K$_{TC}$ and monotonically increments COUNTER$_{TC}$.

In one embodiment, at step 14 (see messaging 928), data consumer #2 903 sends a subscribe message to the same data tag as previously data consumer #1 901.

In one embodiment, at step 15 (see block 930), the DCCF 905 checks whether there is already a notification service running for the requested data tag and identifies the binding of data consumer #1 901 and the data producer 911 and adds the data consumer #1 901 to the binding.

In one embodiment, at step 16 (see messaging 932), the DCCF 905 registers the data consumer #2 903 at the messaging framework 909 for notifications corresponding to the data tag.

In one embodiment, at step 17 (see messaging 934), the DCCF 905 sends a CounterReset message to the data producer 911, the data producer 911 may directly initialize the COUNTER$_{TC}$ for the data tag.

In one embodiment, at step 18 (see messaging 936), the DCCF 905 sends a data exposure response to the data consumer #2 903 including the data tag and the key K$_{TC}$.

In one embodiment, at step 19 (see block 938), upon reception of the key K$_{TC}$, the data consumer #2 903 initializes a corresponding COUNTER$_{TC}$.

In one embodiment, at step 20 (see messaging 940), the DCCF 905 sends a CounterReset message to the data consumer #1 901.

In one embodiment, at step 21 (see block 942), upon reception of the key K$_{TC}$, the data consumer #1 901 initializes a corresponding COUNTER$_{TC}$. The data consumer #1 901 may store the old COUNTER$_{TC}$ in case it subscribed not to real time notifications and retrieves the event notifications always from the messaging framework in certain intervals. In this case, the data consumer #1 901 may store the old COUNTER$_{TC}$ for the duration of this interval or until the next event notification from the messaging framework 909 in case the MAC-I$_{TC}$ was still computed with the old COUNTER$_{TC}$ value.

In one embodiment, at step 22 (see block 944), an event with respect to the data tag occurs and the data producer 911 includes the event data in a TC for transmission via the messaging framework 909. The data producer 911 encrypts the TC with the $K_{TC}$, and integrity protects the TC with a MAC-$I_{TC}$ e.g., in a similar manner as the SoR-MAC-$I_{AUSF}$ as defined in Annex A.17 of TS 33.501. The MAC-$I_{TC}$ is based on the payload, e.g., the TC of the NF service request (e.g., EventExposure_Notify service operation) message, which form the input TC data, a counter of the NF service request (e.g., EventExposure_Notify service operation) messages COUNTER$_{TC}$, and the key $K_{TC}$ to the KDF. Alternatively, instead of the TC, the full NF service request message may be used as data input to compute the MAC-$I_{TC}$, accordingly the data consumer 901, 903 would have to do the same. The MAC-$I_{TC}$ is identified with the 128 least significant bits of the output of the KDF. The data producer 911 monotonically increments COUNTER$_{TC}$ for each additional calculated MAC-$I_{TC}$.

In one embodiment, at step 23 (see messaging 946), the data producer 911 sends the requested data in an NF service request (e.g., EventExposure_Notify service operation) with the protected TC to the messaging framework 909. The message may include the data tag corresponding to the event.

In one embodiment, at step 24 (see messaging 948, 950), the messaging framework 909 identifies the data consumers #1 901 and #2 903 subscribed to the data tag and sends a requested data in an NF service request (e.g., EventExposure_Notify service operation) including the protected TC to the data consumers #1 901 and #2 903.

In one embodiment, at step 25 (see block 952, 954), the data consumers 901, 903 verify the MAC-$I_{TC}$ of the NF service request (e.g., EventExposure_Notify service operation), e.g., they select the key $K_{TC}$ based on the data tag and compute with the key $K_{TC}$ the MAC-I over the NF service request payload (e.g., EventExposure_Notify service operation), e.g., the TC, in the similar way as the data producer 911 and compare the result with the MAC-$I_{TC}$ included in message. If both are identical, then the message was not modified by the messaging framework 909. The data consumers 901, 903 decrypt the TC with the key $K_{TC}$ and monotonically increment COUNTER$_{TC}$.

As a variation of the above embodiment, the data producer 911 may generate asymmetric keys for the data producer 911 and the data consumer 901, 903, e.g., a public key provisioned to the data producer 911 for encryption and integrity protection and a private key for the data consumers 901, 903 for decryption.

Figure 10A:
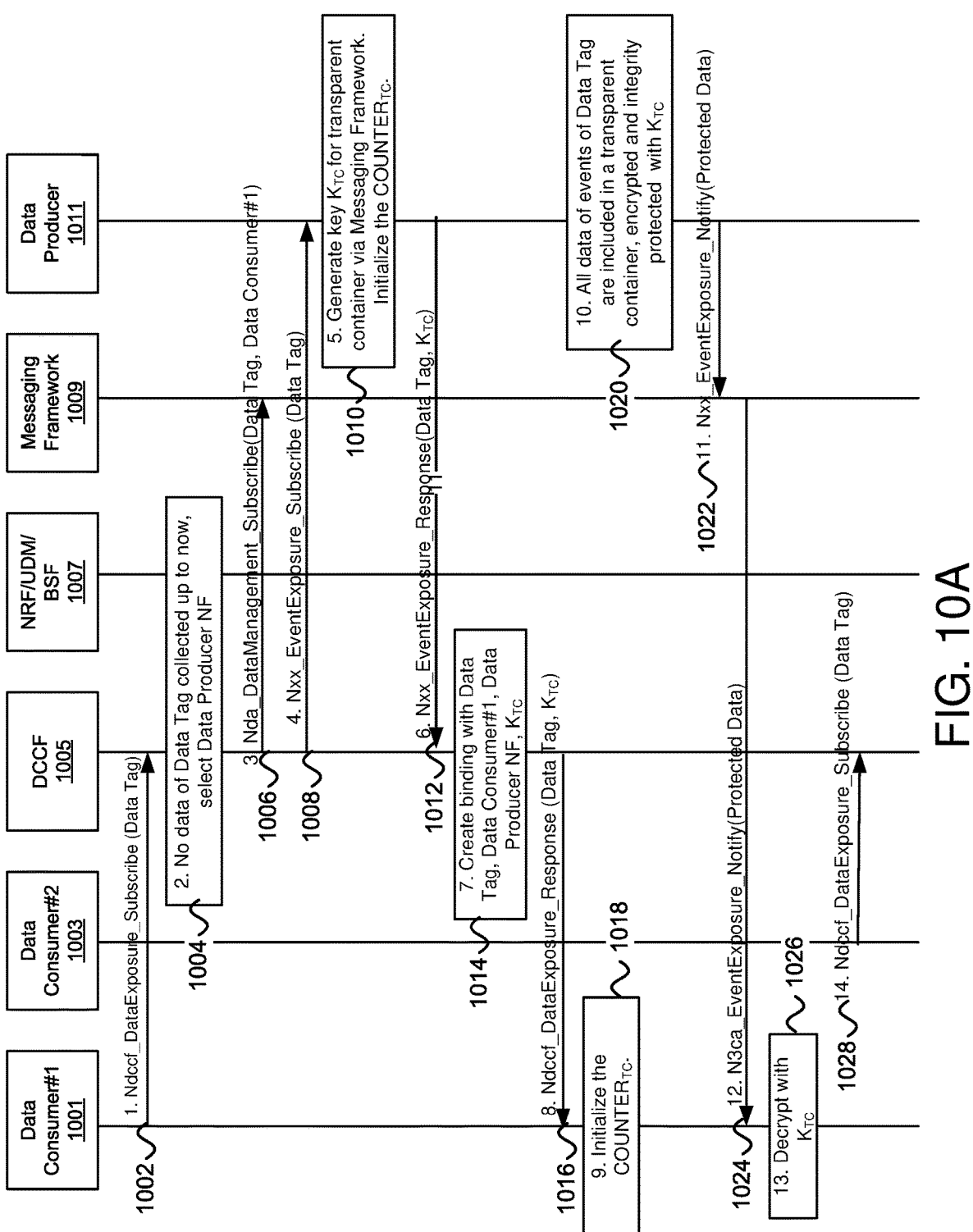
FIG. 10A is a second variation of an embodiment of key handling in the data producer.
Figure 10B:
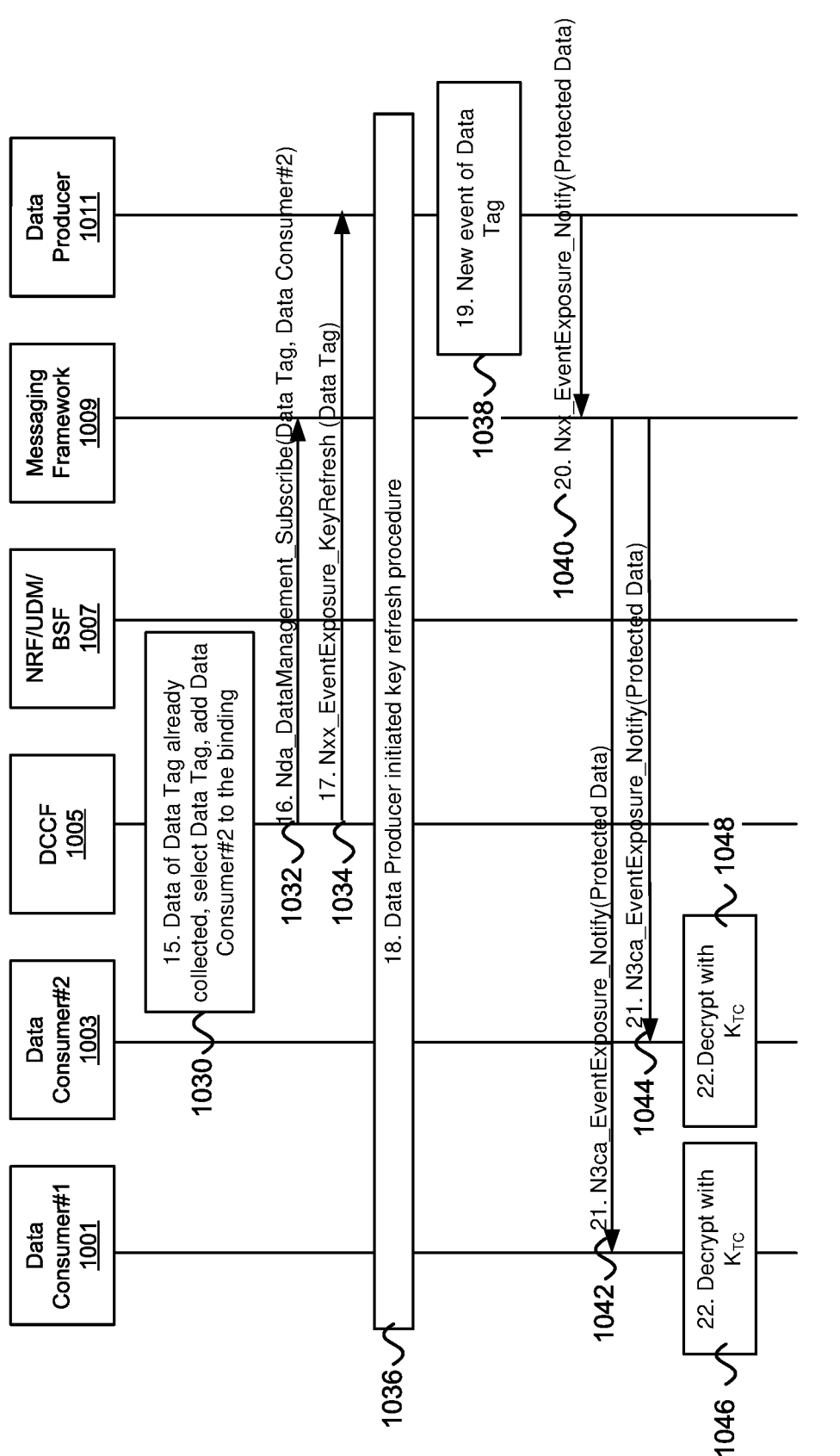
FIG. 10B is a continuation of FIG. 10A.

A second variation, shown in FIGS. 10A and 10B, describes the key exchange with the key refresh procedure when a new data consumer joins the same data tag notifications via the messaging framework.

In one embodiment, at step 1 (see messaging 1002), the data consumer #1 1001 subscribes for data notifications for a specific data tag. The data tag includes information to identify the data required (e.g., a set of Event ID(s) from data producer NF), information to identify the UE (single UE, group of UE(s) or any UE), optionally information to identify the data producer 1011, and filtering information such as location area or time of day where data is required from.

In one embodiment, at step 2 (see block 1004), the DCCF 1005 checks whether there is already a notification service running for the requested data tag. If not, the DCCF 1005 requests from the NRF/UDM/BSF 1007 the data producer 1011 corresponding to the data tag.

In one embodiment, at step 3 (see messaging 1006), the DCCF 1005 registers the data consumer #1 1001 at the messaging framework 1009 for notifications corresponding to the data tag.

In one embodiment, at step 4 (see messaging 1008), the DCCF 1005 sends a service request message to retrieve data from the data producer 1011 including the data tag.

In one embodiment, at step 5 (see block 1010), the data producer 1011 may initialize the COUNTER$_{TC}$ at this point and generates a fresh key $K_{TC}$ for the data tag. $K_{TC}$ is used later by the data producer 1011 to protect the TC that contains the requested event data and is sent via the messaging framework. The data producer 1011 may select the security algorithm, if not preconfigured in the NFs or already selected by the NRF 1007 or DCCF 1005. The security algorithm is sent then to further together with the key $K_{TC}$ to the data consumer 1001, 1003.

In one embodiment, at step 6 (see messaging 1012), the data producer 1011 sends a service response message back to the DCCF 1005 including the data tag and the key $K_{TC}$.

In one embodiment, at step 7 (see block 1014), the DCCF 1005 creates a binding based on the data tag with the key $K_{TC}$, the data consumer #1 1001, and the data producer 1011. This is important so that the DCCF 1005 always knows which network functions are involved for a specific data tag in case the COUNTER$_{TC}$ or the $K_{TC}$ or both need to be updated.

In one embodiment, at step 8 (see messaging 1016), the DCCF 1005 sends a data exposure response to the data consumer #1 1001 including the data tag and the key $K_{TC}$.

In one embodiment, at step 9 (see block 1018), upon reception of the key $K_{TC}$, the data consumer #1 1001 initializes a corresponding COUNTER$_{TC}$.

In one embodiment, at step 10 (see block 1020), an event with respect to the data tag occurs and the data producer 1011 includes the event data in a TC for transmission via the messaging framework 1009. The data producer 1011 encrypts the TC with the $K_{TC}$, and integrity protects the TC with a MAC-$I_{TC}$ e.g., in a similar manner as the SoR-MAC-$I_{AUSF}$ as defined in Annex A.17 of TS 33.501. The MAC-$I_{TC}$ is based on the payload, e.g., the TC of the NF service request (e.g., EventExposure_Notify service operation) message, which form the input TC data, a counter of the NF service request (e.g., EventExposure_Notify service operation) messages COUNTER$_{TC}$, and the key $K_{TC}$ to the KDF. Alternatively, instead of the TC, the full NF service request message may be used as data input to compute the MAC-$I_{TC}$, accordingly the data consumer 1001, 1003 would have to do the same. The MAC-$I_{TC}$ is identified with the 128 least significant bits of the output of the KDF. The data producer 1011 monotonically increments COUNTER$_{TC}$ for each additional calculated MAC-$I_{TC}$.

In one embodiment, at step 11 (see messaging 1022), the data producer 1011 sends the requested data in an NF service request (e.g., EventExposure_Notify service operation) with the protected TC to the messaging framework 1009. The message may include the data tag corresponding to the event.

In one embodiment, at step 12 (see messaging 1024), the messaging framework 1009 identifies the data consumer 1001, 1003 subscribed to the data tag and sends a requested data in an NF service request (e.g., EventExposure_Notify service operation) including the protected TC to the data consumer #1 1001.

In one embodiment, at step 13 (see block 1026), the data consumer 1001, 1003 verifies the MAC-$I_{TC}$ of the NF service request (e.g., EventExposure_Notify service operation) message, e.g., it selects the key $K_{TC}$ based on the data tag and computes with the key $K_{TC}$ the MAC-I over the NF service request (e.g., EventExposure_Notify service operation) payload, e.g., the TC, in the similar way as the data producer 1011 and compares the result with the MAC-I$_{TC}$ included in message. If both are identical, then the message was not modified by the messaging framework 1009. The data consumer #1 1001 decrypts the TC with the key $K_{TC}$ and monotonically increments COUNTER$_{TC}$.

In one embodiment, at step 14 (see messaging 1028), data consumer #2 1003 sends a subscribe message to the same data tag as previously data consumer #1 1001.

In one embodiment, at step 15 (see block 1030), the DCCF 1005 checks whether there is already a notification service running for the requested data tag and identifies the binding of data consumer #1 1001 and the data producer 1011 and adds the data consumer #1 1001 to the binding.

In one embodiment, at step 16 (see messaging 1032), the DCCF 1005 registers the data consumer #2 1003 at the messaging framework 1009 for notifications corresponding to the data tag.

In one embodiment, at step 17 (see messaging 1034), the DCCF 1005 sends a key refresh trigger message for the data tag to the data producer 1011.

In one embodiment, at step 18 (see block 1036), the data producer 1011 performs a key refresh procedure as described below with reference to FIG. 10.

In one embodiment, at step 19 (see block 1038), an event with respect to the data tag occurs and the data producer 1011 includes the event data in a TC for transmission via the messaging framework. The data producer 1011 encrypts the TC with the $K_{TC}$, and integrity protects the TC with a MAC-I$_{TC}$ e.g., in a similar manner as the SoR-MAC-I$_{AUSF}$ as defined in Annex A.17 of TS 33.501. The MAC-I$_{TC}$ is based on the payload, e.g., the TC of the NF service request (e.g., EventExposure_Notify service operation) message, which form the input TC data, a counter of the NF service request (e.g., EventExposure_Notify service operation) messages COUNTER$_{TC}$, and the key $K_{TC}$ to the KDF. Alternatively, instead of the TC, the full NF service request message may be used as data input to compute the MAC-I$_{TC}$, accordingly the data consumer 1001, 1003 would have to do the same. The MAC-I$_{TC}$ is identified with the 128 least significant bits of the output of the KDF. The data producer 1011 monotonically increments COUNTER$_{TC}$ for each additional calculated MAC-I$_{TC}$.

In one embodiment, at step 20 (see messaging 1040), the data producer 1011 sends the requested data in an NF service request (e.g., EventExposure_Notify service operation) with the protected TC to the messaging framework 1009. The message may include the data tag corresponding to the event.

In one embodiment, at step 21 (see messaging 1042, 1044), the messaging framework 1009 identifies the data consumers #1 1001 and #2 1003 subscribed to the data tag and sends a requested data in an NF service request (e.g., EventExposure_Notify service operation) including the protected TC to the data consumers #1 1001 and #2 1003.

In one embodiment, at step 22 (see block 1046, 1048), the data consumers 1001, 1003 verify the MAC-I$_{TC}$ of the NF service request (e.g., EventExposure_Notify service operation), e.g., they select the key $K_{TC}$ based on the data tag and compute with the key $K_{TC}$ the MAC-I over the NF service request payload (e.g., EventExposure_Notify service operation), e.g., the TC, in the similar way as the data producer 1011 and compare the result with the MAC-I$_{TC}$ included in message. If both are identical, then the message was not modified by the messaging framework 1009. The data consumers 1001, 1003 decrypt the TC with the key $K_{TC}$ and monotonically increment COUNTER$_{TC}$.

As a variation of the above embodiment, the data producer 1011 may generate asymmetric keys for the data producer 1011 and the data consumer 1001, 1003, e.g., a public key provisioned to the data producer 1011 for encryption and integrity protection and a private key for the data consumers 1001, 1003 for decryption.

Figure 11:
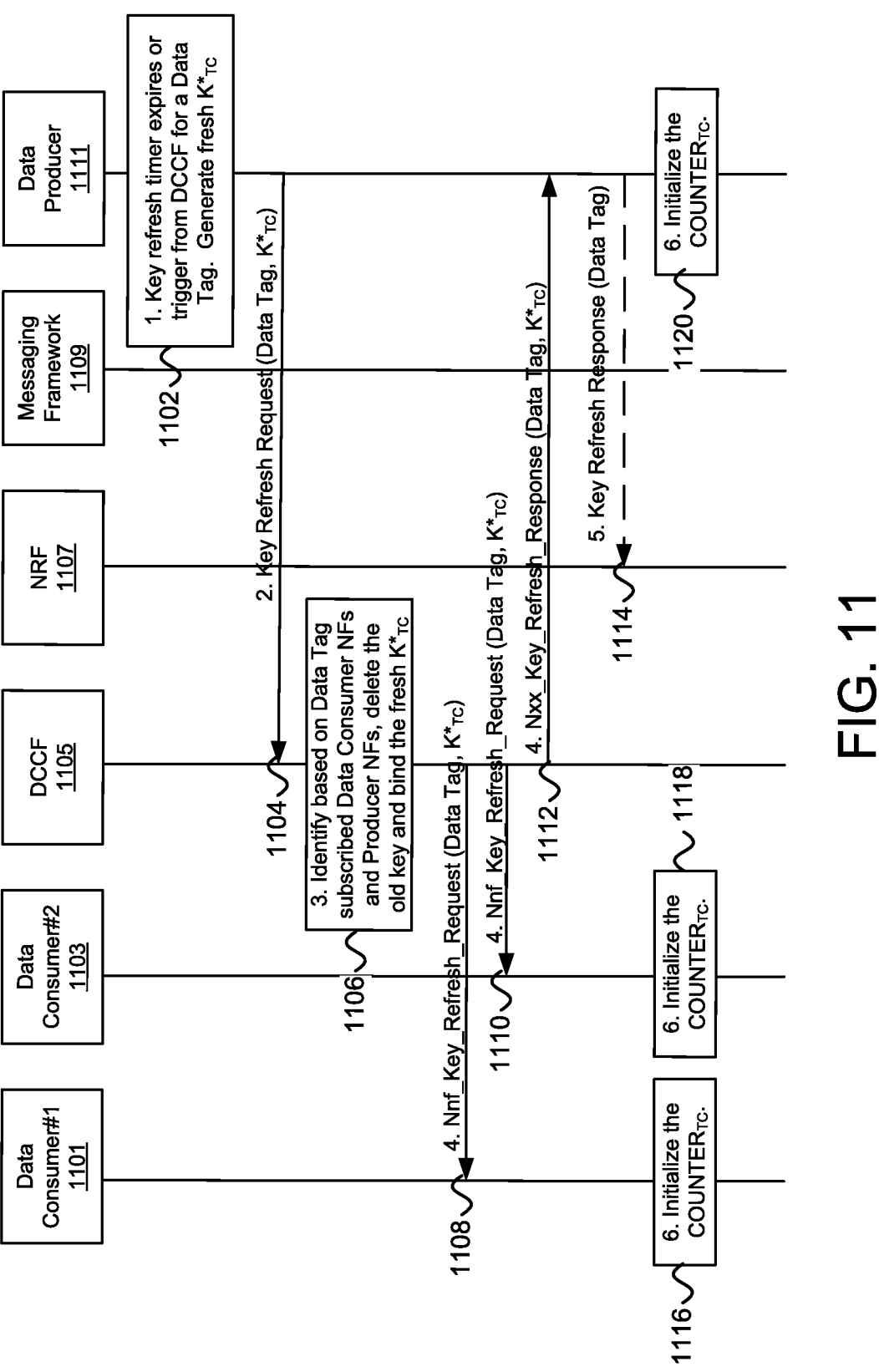
FIG. 11 is an embodiment of data producer-initiated key refresh.

FIG. 11 depicts a data producer-initiated key refresh procedure. Since the key $K_{TC}$ is shared between several data consumers and data producers, it is recommended to frequently change the key either with a limited lifetime or at a change of data consumers subscribing to the events of a specific data tag.

In one embodiment, at step 1 (see block 1102), the data producer 1111 receives a key refresh trigger from the DCCF 1105 or the $K_{TC}$ refresh timer for a specific data tag expires/reaches the value of the key lifetime. The data producer 1111 generates a fresh $K^*_{TC}$. The data producer 1111 may select the security algorithm, if not preconfigured in the NFs or already selected by the NRF 1107 or DCCF 1105. The security algorithm is sent then further together with the key $K_{TC}$ to the data consumer 1101, 1103.

In one embodiment, at step 2 (see messaging 1104), the data producer 1111 sends a key refresh request to the DCCF 1105 including the data tag and the $K^*_{TC}$.

In one embodiment, at step 3 (see block 1106), the DCCF 1105 identifies, based on the data tag, the subscribed data consumer NFs 1101, 1103 and the data producer NF 1111. The DCCF 1105 deletes the old key $K_{TC}$ and binds the new key $K^*_{TC}$ to the involved NFs of the data tag.

In one embodiment, at step 4 (see messaging 1108, 1110, 1112), the DCCF 1105 sends a key refresh request to all data consumer NFs 1101, 1103 and the data producer NF 1111 including the data tag and the new key K*TC.

In one embodiment, at step 5 (see messaging 1114), if step 1 was initiated by the data producer 1111 without trigger from the DCCF 1105 before (e.g., such as in FIG. 4B, step 18), e.g., based on data producer internal logic, e.g., a timer, then the DCCF 1111 acknowledges the successful key refresh to the NRF 1107.

In one embodiment, at step 6 (see block 1116, 1118, 1120), the data consumers 1101, 1103 may store the old COUNTER$_{TC}$ as well as the old $K_{TC}$ in case it subscribed not to real time notifications and retrieves the event notifications always from the messaging framework 1109 in certain intervals. In this case, the data consumers 1101, 1103 may store the old COUNTER$_{TC}$ and old $K_{TC}$ for the duration of this interval or until the next event notification from the messaging framework 1109 in case the TC was protected with the old $K_{TC}$ and the old COUNTER$_{TC}$ value.

As a variation of the key refresh procedure, the data producer 1111 may generate asymmetric keys for the data producer 1111 and the data consumer 1101, 1103, e.g., a public key provisioned to the data producer 1111 for encryption and integrity protection and a private key for the data consumers 1101, 1103 for decryption.

In general, for the above embodiments, if the DCCF would like to store data in the data repository function ("DRF"), then the DCCF adds the DRF as a data consumer for a specific data tag. The DRF can then decrypt the TC and store it unencrypted in the DRF (e.g., tamperproof) memory. Once a data consumer would like to read historic data of a specific data tag from the DRF, then it creates a corresponding data tag and the DCCF will add the DRF as a data producer. In that scenario, the DRF stores data of data producers and provides the data to data consumers because the DRF has the corresponding key $K_{TC}$ to encrypt/decrypt the data.

Figure 12:
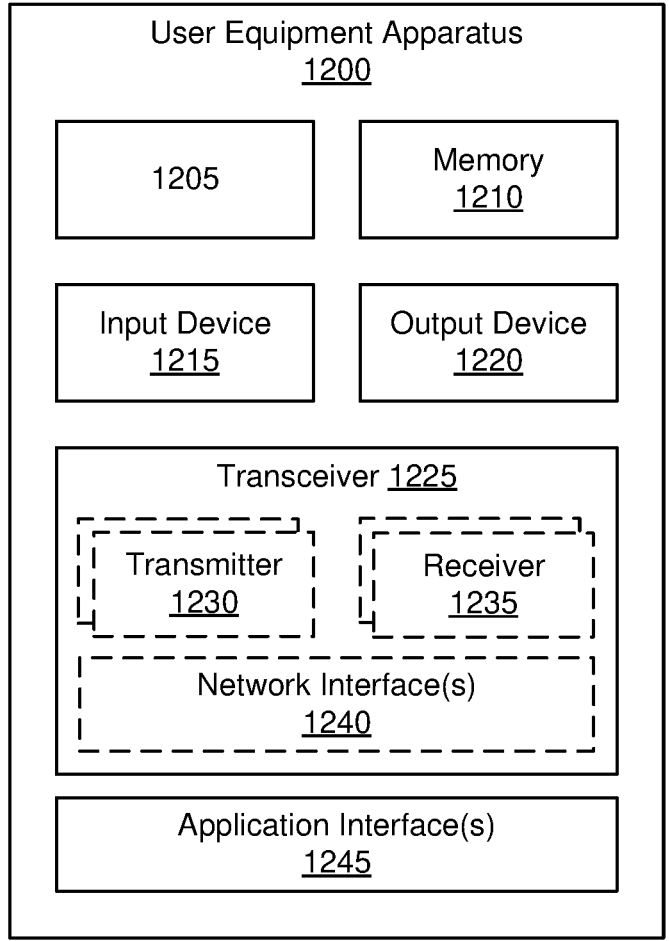
FIG. 12 is a block diagram illustrating one embodiment of a user equipment apparatus that may be used for method of secure data collection via a messaging framework.

FIG. 12 depicts a user equipment apparatus 1200 that may be used for directional transmission/reception of groupcast and unicast communication, according to embodiments of the disclosure. In various embodiments, the user equipment apparatus 1200 is used to implement one or more of the solutions/enhancements described herein. The user equipment apparatus 1200 may be one embodiment of a UE, such as the remote unit 105, as described above. Furthermore, the user equipment apparatus 1200 may include a processor 1205, a memory 1210, an input device 1215, an output device 1220, and a transceiver 1225. In some embodiments, the input device 1215 and the output device 1220 are combined into a single device, such as a touchscreen. In certain embodiments, the user equipment apparatus 1200 may not include any input device 1215 and/or output device 1220. In various embodiments, the user equipment apparatus 1200 may include one or more of: the processor 1205, the memory 1210, and the transceiver 1225, and may not include the input device 1215 and/or the output device 1220.

As depicted, the transceiver 1225 includes at least one transmitter 1230 and at least one receiver 1235. Here, the transceiver 1225 communicates with one or more base units 121. Additionally, the transceiver 1225 may support at least one network interface 1240 and/or application interface 1245. The application interface(s) 1245 may support one or more APIs. The network interface(s) 1240 may support 3GPP reference points, such as Uu and PC5. Other network interfaces 1240 may be supported, as understood by one of ordinary skill in the art.

The processor 1205, in one embodiment, may include any known controller capable of executing computer-readable instructions and/or capable of performing logical operations. For example, the processor 1205 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1205 executes instructions stored in the memory 1210 to perform the methods and routines described herein. The processor 1205 is communicatively coupled to the memory 1210, the input device 1215, the output device 1220, and the transceiver 1225. In various embodiments, the processor 1205 controls the user equipment apparatus 1200 to implement the above described UE behaviors.

The memory 1210, in one embodiment, is a computer readable storage medium. In some embodiments, the memory 1210 includes volatile computer storage media. For example, the memory 1210 may include a RAM, including dynamic RAM ("DRAM"), synchronous dynamic RAM ("SDRAM"), and/or static RAM ("SRAM"). In some embodiments, the memory 1210 includes non-volatile computer storage media. For example, the memory 1210 may include a hard disk drive, a flash memory, or any other suitable non-volatile computer storage device. In some embodiments, the memory 1210 includes both volatile and non-volatile computer storage media.

In some embodiments, the memory 1210 stores data related to method of secure data collection via a messaging framework. For example, the memory 1210 may store configured downlink assignment, configured uplink assignment, UE configurations, resource configurations, and the like. In certain embodiments, the memory 1210 also stores program code and related data, such as an operating system or other controller algorithms operating on the user equipment apparatus 1200 and one or more software applications.

The input device 1215, in one embodiment, may include any known computer input device including a touch panel, a button, a keyboard, a stylus, a microphone, or the like. In some embodiments, the input device 1215 may be integrated with the output device 1220, for example, as a touchscreen or similar touch-sensitive display. In some embodiments, the input device 1215 includes a touchscreen such that text may be input using a virtual keyboard displayed on the touchscreen and/or by handwriting on the touchscreen. In some embodiments, the input device 1215 includes two or more different devices, such as a keyboard and a touch panel.

The output device 1220, in one embodiment, is designed to output visual, audible, and/or haptic signals. In some embodiments, the output device 1220 includes an electronically controllable display or display device capable of outputting visual data to a user. For example, the output device 1220 may include, but is not limited to, an LCD display, an LED display, an OLED display, a projector, or similar display device capable of outputting images, text, or the like to a user. As another, non-limiting, example, the output device 1220 may include a wearable display separate from, but communicatively coupled to, the rest of the user equipment apparatus 1200, such as a smart watch, smart glasses, a heads-up display, or the like. Further, the output device 1220 may be a component of a smart phone, a personal digital assistant, a television, a table computer, a notebook (laptop) computer, a personal computer, a vehicle dashboard, or the like.

In certain embodiments, the output device 1220 includes one or more speakers for producing sound. For example, the output device 1220 may produce an audible alert or notification (e.g., a beep or chime). In some embodiments, the output device 1220 includes one or more haptic devices for producing vibrations, motion, or other haptic feedback. In some embodiments, all, or portions of the output device 1220 may be integrated with the input device 1215. For example, the input device 1215 and output device 1220 may form a touchscreen or similar touch-sensitive display. In other embodiments, the output device 1220 may be located near the input device 1215.

The transceiver 1225 includes at least transmitter 1230 and at least one receiver 1235. The transceiver 1225 may be used to provide UL communication signals to a base unit 121 and to receive DL communication signals from the base unit 121, as described herein. Although only one transmitter 1230 and one receiver 1235 are illustrated, the user equipment apparatus 1200 may have any suitable number of transmitters 1230 and receivers 1235. Further, the transmitter(s) 1230 and the receiver(s) 1235 may be any suitable type of transmitters and receivers. In one embodiment, the transceiver 1225 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair is used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components.

For example, certain transceivers 1225, transmitters 1230, and receivers 1235 may be implemented as physically separate components that access a shared hardware resource and/or software resource, such as for example, the network interface 1240.

In various embodiments, one or more transmitters 1230 and/or one or more receivers 1235 may be implemented and/or integrated into a single hardware component, such as a multi-transceiver chip, a system-on-a-chip, an ASIC, or other type of hardware component. In certain embodiments, one or more transmitters 1230 and/or one or more receivers 1235 may be implemented and/or integrated into a multi-chip module. In some embodiments, other components such as the network interface 1240 or other hardware components/circuits may be integrated with any number of transmitters 1230 and/or receivers 1235 into a single chip. In such embodiment, the transmitters 1230 and receivers 1235 may be logically configured as a transceiver 1225 that uses one more common control signals or as modular transmitters 1230 and receivers 1235 implemented in the same hardware chip or in a multi-chip module.

In one embodiment, the transceiver 1225 receives a subscription request from a data consumer function, the subscription request comprising a data tag associated with a data producer function. In one embodiment, the processor 1205 generates a security key for the data tag and generates a binding for the data tag between the security key, the data consumer function, and the data producer function.

In one embodiment, the transceiver 1225 transmits, for use in data transmissions between the data producer function and the data consumer function, a service request message to the data producer function, the service request message comprising the data tag and the security key, and a data exposure response message to the data consumer function, the data exposure response message comprising the data tag and the security key.

In one embodiment, the transceiver 1225 receives a subscription request from one or more second data consumer functions, the subscription request comprising the data tag associated with the data producer function and the processor 1205 initiates a key refresh procedure for the data tag in response to determining that a binding exists for the data tag between the security key, the data consumer function, and the data producer function.

In one embodiment, the key refresh procedure comprises generating, by the processor 1205, a new security key for the data tag, identifying, by the processor 1205, based on the data tag, the data consumer function, the one or more second data consumer functions, and the data producer, deleting, by the processor 1205, the binding for the data tag between the security key, the data consumer function, and the data producer function, generating, by the processor 1205, a new binding for the data tag between the new security key, the data consumer function, the one or more second data consumer functions, and the data producer function, and transmitting, by the transceiver 1225, a key refresh request to the data consumer function, the one or more second data consumer functions, and the data producer function, the key refresh request comprising the new security key.

In one embodiment, the key refresh procedure comprises generating, by the processor 1205, asymmetric keys for the data consumer function, the one or more second data consumer functions, and the data producer function, the asymmetric keys comprising a public key provisioned for the data producer function and corresponding private keys provisioned for the data consumer function and the one or more second data consumer functions.

In one embodiment, the data tag comprises one or more of the data requested from the data producer function, identifying information for a device associated with the data consumer function, identifying information for the data producer function, and filtering information associated with the data.

In one embodiment, the processor 1205 selects the security algorithm for generating the security key and the transceiver 1225 transmits the security algorithm, along with the security key, to the data consumer function and the data producer function.

In one embodiment, the processor 1205 registers the data consumer function with a messaging framework for notifications related to the data tag.

In one embodiment, the transceiver 1225 transmits a subscription request to a network function, the subscription request comprising a data tag associated with a data producer function. In one embodiment, the transceiver 1225 receives a data exposure response message from the network function, the data exposure response message comprising the data tag and a security key. In one embodiment, the transceiver 1225 receives a service request message comprising encrypted data requested from the data producer function. In one embodiment, the processor 1205 decrypts the encrypted data using the security key.

In one embodiment, the encrypted data is contained in a transparent container ("TC") that is encrypted using the security key.

In one embodiment, the processor 1205 verifies the service request message by verifying the message authentication code—integrity for the TC ("MAC-I$_{TC}$") of the service request message.

In one embodiment, the processor 1205 verifies the MAC-I$_{TC}$ of the TC by computing the MAC-I over the TC using the security key and compares the computed MAC-I$_{TC}$ to the MAC-I$_{TC}$ of the service request message.

In one embodiment, the transceiver 1225 receives a service request message from a network function, the service request message comprising a data tag and a security key. In one embodiment, the processor 1205 detects an event associated with the data tag, stores data associated with the event in a transparent container ("TC") and encrypts the TC with the received security key and integrity protects the TC with a message authentication code—integrity for the TC ("MAC-I$_{TC}$"). In one embodiment, the transceiver 1225 transmits the TC to a data consumer associated with the data tag.

In one embodiment, the processor 1205 derives the MAC-I$_{TC}$ based on the TC and the security key received in a service request message.

In one embodiment, the processor 1205 derives the MAC-I$_{TC}$ based the entire service request message.

In one embodiment, the processor 1205 identifies the MAC-I$_{TC}$ by the 128 least significant bits of an output of a key derivation function that is used to generate the MAC-I$_{TC}$.

Figure 13:
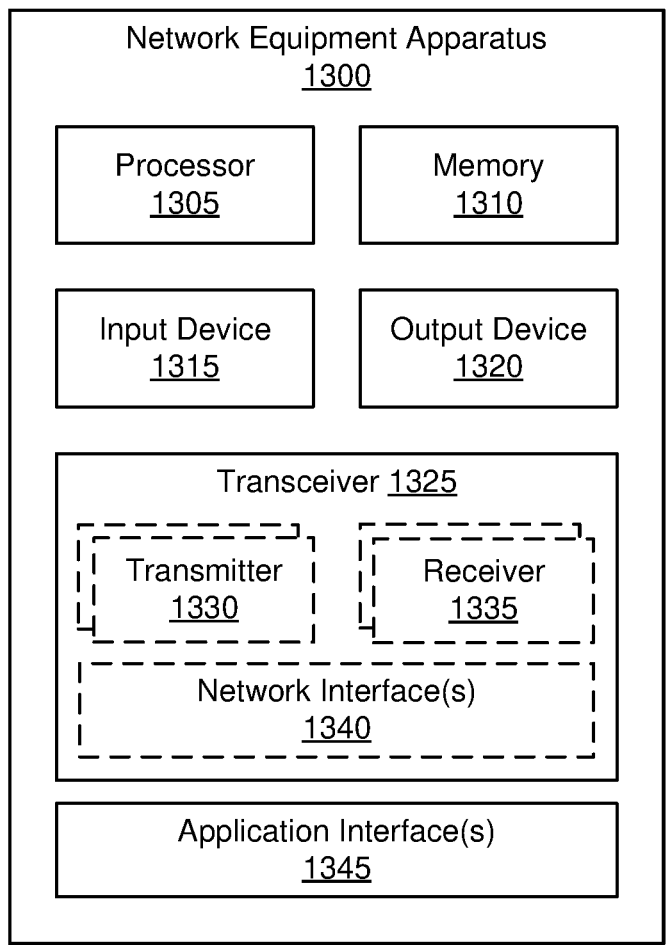
FIG. 13 is a block diagram illustrating one embodiment of a network equipment apparatus that may be used for method of secure data collection via a messaging framework.

FIG. 13 depicts one embodiment of a network equipment apparatus 1300 that may be used for directional transmission/reception of groupcast and unicast communication, according to embodiments of the disclosure. In some embodiments, the network apparatus 1300 may be one embodiment of a RAN node and its supporting hardware, such as the base unit 121, the RAN node 407 and/or gNB, described above. Furthermore, network equipment apparatus 1300 may include a processor 1305, a memory 1309, an input device 1315, an output device 1320, and a transceiver 1325. In certain embodiments, the network equipment apparatus 1300 does not include any input device 1315 and/or output device 1320.

As depicted, the transceiver 1325 includes at least one transmitter 1330 and at least one receiver 1335. Here, the transceiver 1325 communicates with one or more remote units 105. Additionally, the transceiver 1325 may support at least one network interface 1340 and/or application interface 1345. The application interface(s) 1345 may support one or more APIs. The network interface(s) 1340 may support 3GPP reference points, such as Uu, N1, N2 and N3 interfaces. Other network interfaces 1340 may be supported, as understood by one of ordinary skill in the art.

The processor 1305, in one embodiment, may include any known controller capable of executing computer-readable instructions and/or capable of performing logical operations. For example, the processor 1305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1305 executes instructions stored in the memory 1309 to perform the methods and routines described herein. The processor 1305 is communicatively coupled to the memory 1309, the input device 1315, the output device 1320, and the transceiver 1325. In various embodiments, the processor 1305 controls the network equipment apparatus 1300 to implement the above described network entity behaviors (e.g., of the gNB, RAN node) for method of secure data collection via a messaging framework.

The memory 1309, in one embodiment, is a computer readable storage medium. In some embodiments, the memory 1309 includes volatile computer storage media. For example, the memory 1309 may include a RAM, including dynamic RAM ("DRAM"), synchronous dynamic RAM ("SDRAM"), and/or static RAM ("SRAM"). In some embodiments, the memory 1309 includes non-volatile computer storage media. For example, the memory 1309 may include a hard disk drive, a flash memory, or any other suitable non-volatile computer storage device. In some embodiments, the memory 1309 includes both volatile and non-volatile computer storage media.

In some embodiments, the memory 1309 stores data relating to method of secure data collection via a messaging framework. For example, the memory 1309 may store UE configurations, resource configurations, resource grants, and the like. In certain embodiments, the memory 1309 also stores program code and related data, such as an operating system ("OS") or other controller algorithms operating on the network equipment apparatus 1300 and one or more software applications.

The input device 1315, in one embodiment, may include any known computer input device including a touch panel, a button, a keyboard, a stylus, a microphone, or the like. In some embodiments, the input device 1315 may be integrated with the output device 1320, for example, as a touchscreen or similar touch-sensitive display. In some embodiments, the input device 1315 includes a touchscreen such that text may be input using a virtual keyboard displayed on the touchscreen and/or by handwriting on the touchscreen. In some embodiments, the input device 1315 includes two or more different devices, such as a keyboard and a touch panel.

The output device 1320, in one embodiment, may include any known electronically controllable display or display device. The output device 1320 may be designed to output visual, audible, and/or haptic signals. In some embodiments, the output device 1320 includes an electronic display capable of outputting visual data to a user. Further, the output device 1320 may be a component of a smart phone, a personal digital assistant, a television, a table computer, a notebook (laptop) computer, a personal computer, a vehicle dashboard, or the like.

In certain embodiments, the output device 1320 includes one or more speakers for producing sound. For example, the output device 1320 may produce an audible alert or notification (e.g., a beep or chime). In some embodiments, the output device 1320 includes one or more haptic devices for producing vibrations, motion, or other haptic feedback. In some embodiments, all, or portions of the output device 1320 may be integrated with the input device 1315. For example, the input device 1315 and output device 1320 may form a touchscreen or similar touch-sensitive display. In other embodiments, all, or portions of the output device 1320 may be located near the input device 1315.

As discussed above, the transceiver 1325 may communicate with one or more remote units and/or with one or more interworking functions that provide access to one or more PLMNs. The transceiver 1325 may also communicate with one or more network functions (e.g., in the mobile core network 40). The transceiver 1325 operates under the control of the processor 1305 to transmit messages, data, and other signals and also to receive messages, data, and other signals. For example, the processor 1305 may selectively activate the transceiver (or portions thereof) at particular times in order to send and receive messages.

The transceiver 1325 may include one or more transmitters 1330 and one or more receivers 1335. In certain embodiments, the one or more transmitters 1330 and/or the one or more receivers 1335 may share transceiver hardware and/or circuitry. For example, the one or more transmitters 1330 and/or the one or more receivers 1335 may share antenna(s), antenna tuner(s), amplifier(s), filter(s), oscillator(s), mixer(s), modulator/demodulator(s), power supply, and the like. In one embodiment, the transceiver 1325 implements multiple logical transceivers using different communication protocols or protocol stacks, while using common physical hardware.

In one embodiment, the transceiver 1325 receives a subscription request from a data consumer function, the subscription request comprising a data tag associated with a data producer function. In one embodiment, the processor 1305 generates a security key for the data tag and generates a binding for the data tag between the security key, the data consumer function, and the data producer function.

In one embodiment, the transceiver 1325 transmits, for use in data transmissions between the data producer function and the data consumer function, a service request message to the data producer function, the service request message comprising the data tag and the security key, and a data exposure response message to the data consumer function, the data exposure response message comprising the data tag and the security key.

In one embodiment, the transceiver 1325 receives a subscription request from one or more second data consumer functions, the subscription request comprising the data tag associated with the data producer function and the processor 1305 initiates a key refresh procedure for the data tag in response to determining that a binding exists for the data tag between the security key, the data consumer function, and the data producer function.

In one embodiment, the key refresh procedure comprises generating, by the processor 1305, a new security key for the data tag, identifying, by the processor 1305, based on the data tag, the data consumer function, the one or more second data consumer functions, and the data producer, deleting, by the processor 1305, the binding for the data tag between the security key, the data consumer function, and the data producer function, generating, by the processor 1305, a new binding for the data tag between the new security key, the data consumer function, the one or more second data consumer functions, and the data producer function, and transmitting, by the transceiver 1325, a key refresh request to the data consumer function, the one or more second data consumer functions, and the data producer function, the key refresh request comprising the new security key.

In one embodiment, the key refresh procedure comprises generating, by the processor 1305, asymmetric keys for the data consumer function, the one or more second data consumer functions, and the data producer function, the asymmetric keys comprising a public key provisioned for the data producer function and corresponding private keys provisioned for the data consumer function and the one or more second data consumer functions.

In one embodiment, the data tag comprises one or more of the data requested from the data producer function, identifying information for a device associated with the data consumer function, identifying information for the data producer function, and filtering information associated with the data.

In one embodiment, the processor 1305 selects the security algorithm for generating the security key and the transceiver 1325 transmits the security algorithm, along with the security key, to the data consumer function and the data producer function.

In one embodiment, the processor 1305 registers the data consumer function with a messaging framework for notifications related to the data tag.

In one embodiment, the transceiver 1325 transmits a subscription request to a network function, the subscription request comprising a data tag associated with a data producer function. In one embodiment, the transceiver 1325 receives a data exposure response message from the network function, the data exposure response message comprising the data tag and a security key. In one embodiment, the transceiver 1325 receives a service request message comprising encrypted data requested from the data producer function. In one embodiment, the processor 1305 decrypts the encrypted data using the security key.

In one embodiment, the encrypted data is contained in a transparent container ("TC") that is encrypted using the security key.

In one embodiment, the processor 1305 verifies the service request message by verifying the message authentication code—integrity for the TC ("MAC-I$_{TC}$") of the service request message.

In one embodiment, the processor 1305 verifies the MAC-I$_{TC}$ of the TC by computing the MAC-I over the TC using the security key and compares the computed MAC-I$_{TC}$ to the MAC-I$_{TC}$ of the service request message.

In one embodiment, the transceiver 1325 receives a service request message from a network function, the service request message comprising a data tag and a security key. In one embodiment, the processor 1305 detects an event associated with the data tag, stores data associated with the event in a transparent container ("TC") and encrypts the TC with the received security key and integrity protects the TC with a message authentication code—integrity for the TC ("MAC-I$_{TC}$"). In one embodiment, the transceiver 1325 transmits the TC to a data consumer associated with the data tag.

In one embodiment, the processor 1305 derives the MAC-I$_{TC}$ based on the TC and the security key received in a service request message.

In one embodiment, the processor 1305 derives the MAC-I$_{TC}$ based the entire service request message.

In one embodiment, the processor 1305 identifies the MAC-I$_{TC}$ by the 128 least significant bits of an output of a key derivation function that is used to generate the MAC-I$_{TC}$.

FIG. 14 is a flowchart diagram of a method 1400 for secure data collection via a messaging framework. The method 1400 may be performed by a communication device as described herein, such as a user equipment apparatus 1200 and/or a network equipment apparatus 1300. In some embodiments, the method 1400 may be performed by a processor executing program code, for example, a microcontroller, a microprocessor, a CPU, a GPU, an auxiliary processing unit, a FPGA, or the like.

In one embodiment, the method 1400 receives 1405 a subscription request from a data consumer function, the subscription request comprising a data tag associated with a data producer function. In one embodiment, the method 1400 generates 1410 a security key for the data tag and generates 1415 a binding for the data tag between the security key, the data consumer function, and the data producer function. In one embodiment, the method 1400 transmits 1420, for use in data transmissions between the data producer function and the data consumer function, a service request message to the data producer function, the service request message comprising the data tag and the security key. In one embodiment, the method 1400 transmits 1425, for use in data transmissions between the data producer function and the data consumer function, a data exposure response message to the data consumer function, the data exposure response message comprising the data tag and the security key. The method 1400 ends.

FIG. 15 is a flowchart diagram of a method 1500 for secure data collection via a messaging framework. The method 1500 may be performed by a communication device as described herein, such as a user equipment apparatus 1200 and/or a network equipment apparatus 1300. In some embodiments, the method 1500 may be performed by a processor executing program code, for example, a microcontroller, a microprocessor, a CPU, a GPU, an auxiliary processing unit, a FPGA, or the like.

In one embodiment, the method 1500 transmits 1505 a subscription request to a network function, the subscription request comprising a data tag associated with a data producer function. In one embodiment, the method 1500 receives 1510 a data exposure response message from the network function, the data exposure response message comprising the data tag and a security key. In one embodiment, the method 1500 receives 1515 a service request message comprising encrypted data requested from the data producer function. In one embodiment, the method 1500 decrypts 1520 the encrypted data using the security key. The method 1500 ends.

Figure 16:
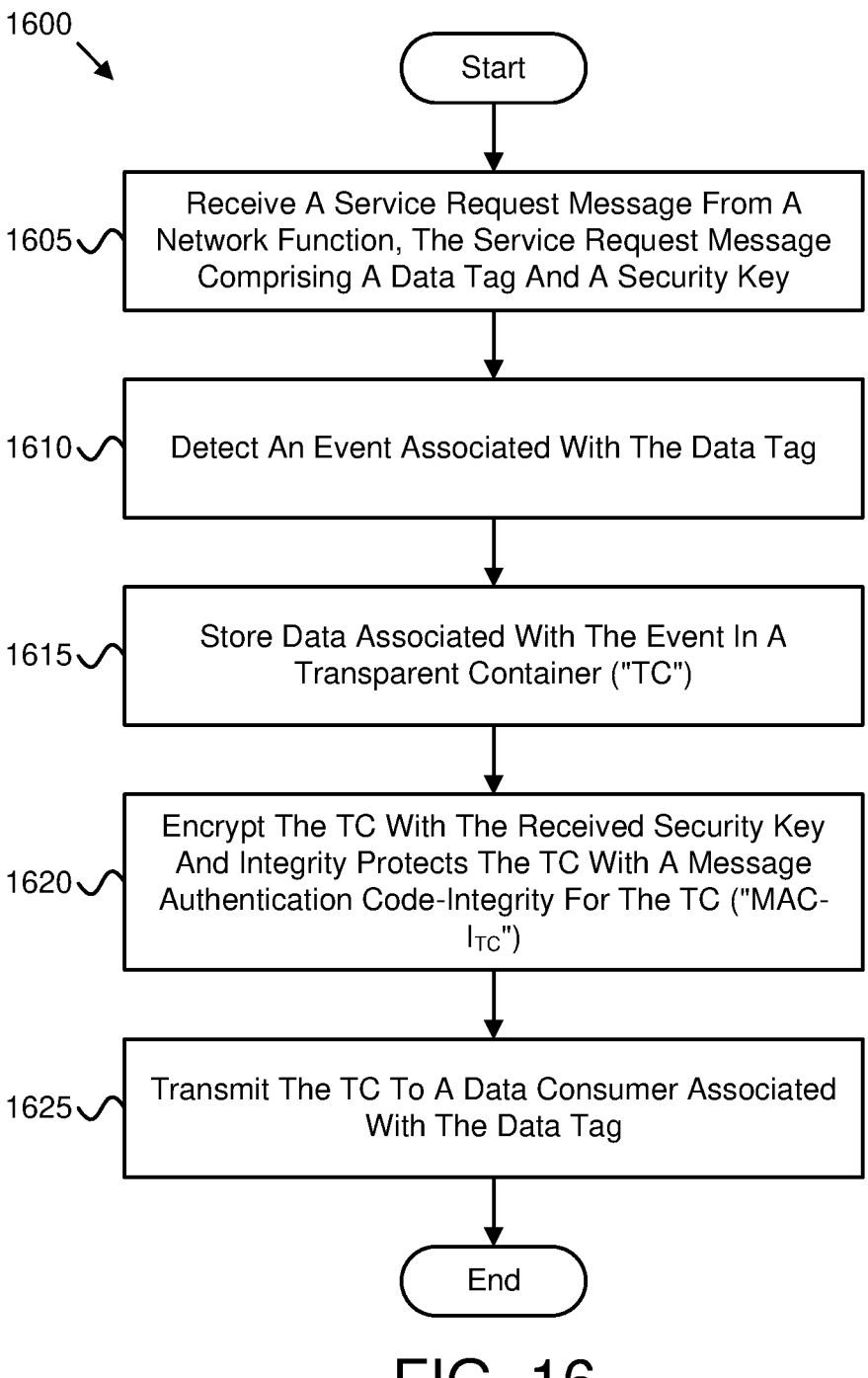
FIG. 16 is a flowchart diagram illustrating one embodiment of a method for secure data collection via a messaging framework.

FIG. 16 is a flowchart diagram of a method 1600 for secure data collection via a messaging framework. The method 1600 may be performed by a communication device as described herein, such as a user equipment apparatus 1200 and/or a network equipment apparatus 1300. In some embodiments, the method 1600 may be performed by a processor executing program code, for example, a microcontroller, a microprocessor, a CPU, a GPU, an auxiliary processing unit, a FPGA, or the like.

In one embodiment, the method 1600 receives 1605 a service request message from a network function, the service request message comprising a data tag and a security key. In one embodiment, the method 1600 detects 1610 an event associated with the data tag. In one embodiment, the method 1600 stores 1615 data associated with the event in a transparent container ("TC"). In one embodiment, the method 1600 encrypts 1620 the TC with the received security key and integrity protects the TC with a message authentication code—integrity for the TC ("MAC-I$_{TC}$"). In one embodiment, the method 1600 transmits 1625 the TC to a data consumer associated with the data tag. The method 1600 ends.

Disclosed herein is a first apparatus for secure data collection via a messaging framework. The first apparatus may include a communication device as described herein, such as a user equipment apparatus 1200 and/or a network equipment apparatus 1300. In some embodiments, the first apparatus may include a processor executing program code, for example, a microcontroller, a microprocessor, a CPU, a GPU, an auxiliary processing unit, a FPGA, or the like.

In one embodiment, the first apparatus includes a transceiver that receives a subscription request from a data consumer function, the subscription request comprising a data tag associated with a data producer function. In one embodiment, the first apparatus includes a processor that generates a security key for the data tag and generates a binding for the data tag between the security key, the data consumer function, and the data producer function.

In one embodiment, the transceiver transmits, for use in data transmissions between the data producer function and the data consumer function, a service request message to the data producer function, the service request message comprising the data tag and the security key, and a data exposure response message to the data consumer function, the data exposure response message comprising the data tag and the security key.

In one embodiment, the transceiver receives a subscription request from one or more second data consumer functions, the subscription request comprising the data tag associated with the data producer function and the processor initiates a key refresh procedure for the data tag in response to determining that a binding exists for the data tag between the security key, the data consumer function, and the data producer function.

In one embodiment, the key refresh procedure comprises generating, by the processor, a new security key for the data tag, identifying, by the processor, based on the data tag, the data consumer function, the one or more second data consumer functions, and the data producer, deleting, by the processor, the binding for the data tag between the security key, the data consumer function, and the data producer function, generating, by the processor, a new binding for the data tag between the new security key, the data consumer function, the one or more second data consumer functions, and the data producer function, and transmitting, by the transceiver, a key refresh request to the data consumer function, the one or more second data consumer functions, and the data producer function, the key refresh request comprising the new security key.

In one embodiment, the key refresh procedure comprises generating, by the processor, asymmetric keys for the data consumer function, the one or more second data consumer functions, and the data producer function, the asymmetric keys comprising a public key provisioned for the data producer function and corresponding private keys provisioned for the data consumer function and the one or more second data consumer functions.

In one embodiment, the data tag comprises one or more of the data requested from the data producer function, identifying information for a device associated with the data consumer function, identifying information for the data producer function, and filtering information associated with the data.

In one embodiment, the processor selects the security algorithm for generating the security key and the transceiver transmits the security algorithm, along with the security key, to the data consumer function and the data producer function.

In one embodiment, the processor registers the data consumer function with a messaging framework for notifications related to the data tag.

Disclosed herein is a first method for secure data collection via a messaging framework. The first method may be performed by a communication device as described herein, such as a user equipment apparatus 1200 and/or a network equipment apparatus 1300. In some embodiments, the first method may be performed by a processor executing program code, for example, a microcontroller, a microprocessor, a CPU, a GPU, an auxiliary processing unit, a FPGA, or the like.

In one embodiment, the first method receives a subscription request from a data consumer function, the subscription request comprising a data tag associated with a data producer function. In one embodiment, the first method generates a security key for the data tag and generates a binding for the data tag between the security key, the data consumer function, and the data producer function.

In one embodiment, the first method transmits, for use in data transmissions between the data producer function and the data consumer function, a service request message to the data producer function, the service request message comprising the data tag and the security key, and a data exposure response message to the data consumer function, the data exposure response message comprising the data tag and the security key.

In one embodiment, the first method receives a subscription request from one or more second data consumer functions, the subscription request comprising the data tag associated with the data producer function and initiates a key refresh procedure for the data tag in response to determining that a binding exists for the data tag between the security key, the data consumer function, and the data producer function.

In one embodiment, the key refresh procedure comprises generating a new security key for the data tag, identifying, based on the data tag, the data consumer function, the one or more second data consumer functions, and the data producer, deleting the binding for the data tag between the security key, the data consumer function, and the data producer function, generating a new binding for the data tag between the new security key, the data consumer function, the one or more second data consumer functions, and the data producer function, and transmitting a key refresh request to the data consumer function, the one or more second data consumer functions, and the data producer function, the key refresh request comprising the new security key.

In one embodiment, the key refresh procedure comprises generating, by the processor, asymmetric keys for the data consumer function, the one or more second data consumer functions, and the data producer function, the asymmetric keys comprising a public key provisioned for the data producer function and corresponding private keys provisioned for the data consumer function and the one or more second data consumer functions.

In one embodiment, the data tag comprises one or more of the data requested from the data producer function, identifying information for a device associated with the data consumer function, identifying information for the data producer function, and filtering information associated with the data.

In one embodiment, the first method selects the security algorithm for generating the security key and the transceiver transmits the security algorithm, along with the security key, to the data consumer function and the data producer function.

In one embodiment, the first method registers the data consumer function with a messaging framework for notifications related to the data tag.

Disclosed herein is a second apparatus for secure data collection via a messaging framework. The second apparatus may include a communication device as described herein, such as a user equipment apparatus 1200 and/or a network equipment apparatus 1300. In some embodiments, the second apparatus may include a processor executing program code, for example, a microcontroller, a microprocessor, a CPU, a GPU, an auxiliary processing unit, a FPGA, or the like.

In one embodiment, the second apparatus includes a transceiver that transmits a subscription request to a network function, the subscription request comprising a data tag associated with a data producer function. In one embodiment, the transceiver receives a data exposure response message from the network function, the data exposure response message comprising the data tag and a security key. In one embodiment, the transceiver receives a service request message comprising encrypted data requested from the data producer function. In one embodiment, the second apparatus includes a processor that decrypts the encrypted data using the security key.

In one embodiment, the encrypted data is contained in a transparent container ("TC") that is encrypted using the security key.

In one embodiment, the processor verifies the service request message by verifying the message authentication code—integrity for the TC ("MAC-I$_{TC}$") of the service request message.

In one embodiment, the processor verifies the MAC-I$_{TC}$ of the TC by computing the MAC-I over the TC using the security key and compares the computed MAC-I$_{TC}$ to the MAC-I$_{TC}$ of the service request message.

Disclosed herein is a second method for secure data collection via a messaging framework. The second method may be performed by a communication device as described herein, such as a user equipment apparatus 1200 and/or a network equipment apparatus 1300. In some embodiments, the second method may be performed by a processor executing program code, for example, a microcontroller, a microprocessor, a CPU, a GPU, an auxiliary processing unit, a FPGA, or the like.

In one embodiment, the second method transmits a subscription request to a network function, the subscription request comprising a data tag associated with a data producer function. In one embodiment, the second method receives a data exposure response message from the network function, the data exposure response message comprising the data tag and a security key. In one embodiment, the second method receives a service request message comprising encrypted data requested from the data producer function. In one embodiment, the second method decrypts the encrypted data using the security key.

In one embodiment, the encrypted data is contained in a transparent container ("TC") that is encrypted using the security key.

In one embodiment, the second method verifies the service request message by verifying the message authentication code—integrity for the TC ("MAC-I$_{TC}$") of the service request message.

In one embodiment, the second method verifies the MAC-I$_{TC}$ of the TC by computing the MAC-I over the TC using the security key and compares the computed MAC-I$_{TC}$ to the MAC-I$_{TC}$ of the service request message.

Disclosed herein is a third apparatus for secure data collection via a messaging framework. The third apparatus may include a communication device as described herein, such as a user equipment apparatus 1200 and/or a network equipment apparatus 1300. In some embodiments, the third apparatus may include a processor executing program code, for example, a microcontroller, a microprocessor, a CPU, a GPU, an auxiliary processing unit, a FPGA, or the like.

In one embodiment, the third apparatus includes a transceiver that receives a service request message from a network function, the service request message comprising a data tag and a security key. In one embodiment, the third apparatus includes a processor that detects an event associated with the data tag, stores data associated with the event in a transparent container ("TC") and encrypts the TC with the received security key and integrity protects the TC with a message authentication code—integrity for the TC ("MAC-I$_{TC}$"). In one embodiment, the transceiver transmits the TC to a data consumer associated with the data tag.

In one embodiment, the processor derives the MAC-I$_{TC}$ based on the TC and the security key received in a service request message.

In one embodiment, the processor derives the MAC-I$_{TC}$ based the entire service request message.

In one embodiment, the processor identifies the MAC-I$_{TC}$ by the 128 least significant bits of an output of a key derivation function that is used to generate the MAC-I$_{TC}$.

Disclosed herein is a third method for secure data collection via a messaging framework. The third method may be performed by a communication device as described herein, such as a user equipment apparatus 1200 and/or a network equipment apparatus 1300. In some embodiments, the third method may be performed by a processor executing program code, for example, a microcontroller, a microprocessor, a CPU, a GPU, an auxiliary processing unit, a FPGA, or the like.

In one embodiment, the third method receives a service request message from a network function, the service request message comprising a data tag and a security key. In one embodiment, the third method detects an event associated with the data tag, stores data associated with the event in a transparent container ("TC") and encrypts the TC with the received security key and integrity protects the TC with a message authentication code—integrity for the TC ("MAC-I$_{TC}$"). In one embodiment, the third method transmits the TC to a data consumer associated with the data tag.

In one embodiment, the third method derives the MAC-I$_{TC}$ based on the TC and the security key received in a service request message.

In one embodiment, the third method derives the MAC-I$_{TC}$ based the entire service request message.

In one embodiment, the third method identifies the MAC-I$_{TC}$ by the 128 least significant bits of an output of a key derivation function that is used to generate the MAC-I$_{TC}$.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A network equipment for wireless communication, comprising:

at least one memory; and at least one processor coupled with the at least one memory and configured to cause the network equipment to:

receive a subscription request from a data consumer function, the subscription request comprising a data tag associated with a data producer function;

generate a security key for the data tag;

generate a binding for that associates the data tag, the security key, the data producer function, and the data consumer function, wherein the binding defines an end-to-end data protection relationship between the data producer function and the data consumer function;

transmit a service request message comprising the data tag and the security key to the data producer function; and transmit a data exposure response comprising the data tag and the security key to the data consumer function.

2. The network equipment of claim 1, wherein the at least one processor is configured to cause the network equipment to:

receive a subscription request from one or more second data consumer functions, the subscription request comprising the data tag associated with the data producer function; and initiate a key refresh procedure for the data tag in response to determining that a binding exists for the data tag between the security key, the data consumer function, and the data producer function.

3. The network equipment of claim 2, wherein the at least one processor is configured to cause the network equipment to, for the key refresh procedure:

generate a new security key for the data tag;

identify based on the data tag, the data consumer function, the one or more second data consumer functions, and the data producer function;

delete the binding for the data tag between the security key, the data consumer function, and the data producer function;

generate a new binding for the data tag between the new security key, the data consumer function, the one or more second data consumer functions, and the data producer function; and transmit a key refresh request to the data consumer function, the one or more second data consumer functions, and the data producer function, the key refresh request comprising the new security key.

4. The network equipment of claim 2, wherein the at least one processor is configured to cause the network equipment to, for the key refresh procedure, generate asymmetric keys for the data consumer function, the one or more second data consumer functions, and the data producer function, the asymmetric keys comprising a public key provisioned for the data producer function and corresponding private keys provisioned for the data consumer function and the one or more second data consumer functions.

5. The network equipment of claim 1, wherein the data tag comprises one or more of data requested from the data producer function, identifying information for a device associated with the data consumer function, identifying information for the data producer function, and filtering information.

6. The network equipment of claim 1, wherein the at least one processor is configured to cause the network equipment to select a security algorithm for generating the security key and transmit the security algorithm, along with the security key, to the data consumer function and the data producer function.

7. The network equipment of claim 1, wherein the at least one processor is configured to cause the network equipment to register the data consumer function with a messaging framework for notifications related to the data tag.

8. A method performed by a network equipment, comprising:

receiving a subscription request from a data consumer function, the subscription request comprising a data tag associated with a data producer function;

generating a security key for the data tag;

generating a binding that associates the data tag, the security key, the data producer function, and the data consumer function, wherein the binding defines an end-to-end data protection relationship between the data producer function and the data consumer function;

transmitting a service request message comprising the data tag and the security key to the data producer function; and transmitting a data exposure response comprising the data tag and the security key to the data consumer function.

9. The method of claim 8, further comprising:

receiving a subscription request from one or more second data consumer functions, the subscription request comprising the data tag associated with the data producer function; and initiating a key refresh procedure for the data tag in response to determining that a binding exists for the data tag between the security key, the data consumer function, and the data producer function.

10. The method of claim 9, further comprising, for the key refresh procedure:

generating a new security key for the data tag;

identifying based on the data tag, the data consumer function, the one or more second data consumer functions, and the data producer function;

deleting the binding for the data tag between the security key, the data consumer function, and the data producer function;

generating a new binding for the data tag between the new security key, the data consumer function, the one or more second data consumer functions, and the data producer function; and transmitting a key refresh request to the data consumer function, the one or more second data consumer functions, and the data producer function, the key refresh request comprising the new security key.

11. The method of claim 10, further comprising, for the key refresh procedure, generating asymmetric keys for the data consumer function, the one or more second data consumer functions, and the data producer function, the asymmetric keys comprising a public key provisioned for the data producer function and corresponding private keys provisioned for the data consumer function and the one or more second data consumer functions.

12. The method of claim 8, wherein the data tag comprises one or more of data requested from the data producer function, identifying information for a device associated with the data consumer function, identifying information for the data producer function, and filtering information associated with the data.

\*    \*    \*    \*    \*